US011936599B2

(12) United States Patent
Horn et al.

(10) Patent No.: US 11,936,599 B2
(45) Date of Patent: Mar. 19, 2024

(54) FULL-DUPLEX INDEX MODULATION

(71) Applicant: QUALCOMM Incorporated, San Diego, CA (US)

(72) Inventors: Idan Michael Horn, Hod Hasharon (IL); Assaf Touboul, Netanya (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 17/175,857

(22) Filed: Feb. 15, 2021

(65) Prior Publication Data

US 2021/0288782 A1 Sep. 16, 2021

Related U.S. Application Data

(60) Provisional application No. 62/987,956, filed on Mar. 11, 2020.

(51) Int. Cl.
*H04B 7/00* (2006.01)
*H04L 5/14* (2006.01)
*H04W 72/20* (2023.01)

(52) U.S. Cl.
CPC ............. *H04L 5/14* (2013.01); *H04W 72/20* (2023.01)

(58) Field of Classification Search
CPC ....... H04L 5/14; H04L 5/0094; H04L 5/1461; H04L 5/0091; H04L 5/0023; H04L 5/0044; H04L 5/0053; H04L 5/006; H04W 72/20; H04W 52/0216; H04W 52/0229; H04W 72/23; Y02D 30/70; H04B 1/50; H04B 1/56; H04B 1/44; H04B 1/406; H04B 1/00
See application file for complete search history.

(56) References Cited

U.S. PATENT DOCUMENTS

| 10,848,214 B2* | 11/2020 | Kakishima | H04B 7/0417 |
| 10,951,359 B2* | 3/2021 | Huang | H04L 5/0094 |
| 2012/0039282 A1* | 2/2012 | Kim | H04L 5/0048 370/329 |
| 2013/0163537 A1* | 6/2013 | Anderson | H04L 1/1671 370/329 |

(Continued)

OTHER PUBLICATIONS

International Search Report and Written Opinion—PCT/US2021/018239—ISA/EPO—dated May 25, 2021.

*Primary Examiner* — Phuongchau Ba Nguyen
(74) *Attorney, Agent, or Firm* — Arun Swain

(57) ABSTRACT

Methods, systems, and devices for wireless communications are described. A receiving device and a transmitting device may utilize index modulation for full-duplex operations. The transmitting device, such as a base station or a user equipment (UE), may define blocks of resource elements (REs) for transmissions. The transmitting device may then transmit a power boosted index modulated signal at a data RE location within a resource allocation and may skip transmitting within the remaining REs of the resource allocation. The transmitting device may indicate the number of REs per RE block to the receiving device (e.g., a UE). The receiving device may use this information to perform energy detection for determining which REs within an RE block include the power boosted index modulated transmission and which REs within the RE block are empty REs. In some cases, the receiving device may use the empty REs for performing noise estimation.

32 Claims, 20 Drawing Sheets

(56) References Cited

U.S. PATENT DOCUMENTS

| | | | |
|---|---|---|---|
| 2013/0208669 A1* | 8/2013 | Pan | H04L 5/0048 |
| | | | 370/329 |
| 2018/0103458 A1* | 4/2018 | Tooher | H04W 72/23 |
| 2019/0097779 A1* | 3/2019 | Wu | H04L 1/1858 |
| 2019/0149365 A1* | 5/2019 | Chatterjee | H04L 25/0226 |
| | | | 370/329 |
| 2019/0207737 A1* | 7/2019 | Babaei | H04L 5/0098 |
| 2019/0261372 A1 | 8/2019 | Zhou et al. | |
| 2019/0363831 A1* | 11/2019 | Davydov | H04L 5/0053 |
| 2020/0274635 A1* | 8/2020 | Chen | H04L 1/0003 |
| 2022/0287088 A1* | 9/2022 | Tiirola | H04L 27/0006 |
| 2023/0006783 A1* | 1/2023 | Gao | H04L 5/0094 |

\* cited by examiner

US 11,936,599 B2

FULL-DUPLEX INDEX MODULATION

CROSS REFERENCE

The present application for patent claims the benefit of U.S. Provisional Patent Application No. 62/987,956 by HORN et al., entitled "FULL-DUPLEX INDEX MODULATION," filed Mar. 11, 2020, assigned to the assignee hereof, and expressly incorporated by reference herein.

FIELD OF TECHNOLOGY

The following relates generally to wireless communications and more specifically to full-duplex index modulation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, a UE may be capable of both transmitting uplink traffic to a base station and receiving downlink traffic from a base station simultaneously on a same set of frequency resources (e.g., same or different base stations, different antennas from same or different base stations, etc.). This capability of communicating in two directions (e.g., uplink and downlink) at a same time and at a same frequency may be defined as a full-duplex capability of the UE. However, the full-duplex capability may result in a self-interference at the UE, which can impact downlink traffic, uplink traffic, or both. For example, the self-interference may include a transmission (e.g., an uplink transmission) leaking to receive antennas based on both the transmission and reception occurring within common time and frequency resources, resulting in a high noise floor at the receiver. Efficient techniques are desired for addressing and mitigating this self-interference.

SUMMARY

The described techniques relate to improved methods, systems, devices, and apparatuses that support full-duplex index modulation. Generally, the described techniques provide for a user equipment (UE) (e.g., or another receiving device) to receive index modulated signals from a base station (e.g., or another transmitting device) based on control signaling from the base station that includes a resource element (RE) block configuration indicating a number of REs per RE block ($N_{RE}$) (e.g., the control signaling may include an indication of a predefined index modulation RE block configuration). For example, the base station may transmit a power boosted index modulated signal at a data RE location within each RE block and may skip transmitting any signaling within the remaining REs of each RE block (e.g., the remaining REs with no signaling may be referred to as empty REs). In some cases, the power boost may be a function of the number of REs per RE block, and the base station may select the power boost to keep a same amount of total transmitted energy across the RE block (e.g., as if the base station were not skipping transmission within the empty REs).

Subsequently, the UE may use the indication of the number of REs per RE block to perform energy detection for determining which one or more REs within the RE block include the power boosted index modulated transmission and which one or more REs within the RE block are empty REs. Additionally, the UE may use the empty REs for performing noise estimation, and, in some cases, the UE may request the number of REs to include in the RE block (e.g., for future transmissions, the initial transmission, etc.). The UE may request the number of REs per RE block based on a requested or configured modulation and coding scheme (MCS), requested or configured modulation constellation, a requested or configured frequency allocation, etc.

A method of wireless communications by a UE is described. The method may include receiving control signaling indicating a RE block configuration that indicates a number of REs per RE block, receiving a grant indicating a resource allocation, and monitoring, based on the RE block configuration, for at least one empty RE within the resource allocation and an index modulated transmission within a data or control RE within the resource allocation.

An apparatus for wireless communications by a UE is described. The apparatus may include a processor, memory coupled with the processor, and instructions stored in the memory. The instructions may be executable by the processor to cause the apparatus to receive control signaling indicating a RE block configuration that indicates a number of REs per RE block, to receive a grant indicating a resource allocation, and to monitor, based on the RE block configuration, for at least one empty RE within the resource allocation and an index modulated transmission within a data or control RE within the resource allocation.

Another apparatus for wireless communications by a UE is described. The apparatus may include means for receiving control signaling indicating a RE block configuration that indicates a number of REs per RE block, means for receiving a grant indicating a resource allocation, and means for monitoring, based on the RE block configuration, for at least one empty RE within the resource allocation and an index modulated transmission within a data or control RE within the resource allocation.

A non-transitory computer-readable medium storing code for wireless communications by a UE is described. The code may include instructions executable by a processor to receive control signaling indicating a RE block configuration that indicates a number of REs per RE block, to receive a grant indicating a resource allocation, and to monitor, based on the RE block configuration, for at least one empty RE within the resource allocation and an index modulated transmission within a data or control RE within the resource allocation.

In some examples of the method, apparatuses, and non-transitory computer-readable medium described herein, receiving the grant further may include operations, features, means, or instructions for receiving the grant scheduling the UE to operate in a full-duplex mode and to transmit an uplink transmission within the resource allocation, and transmitting the uplink transmission within the resource allocation.

Some examples of the method, apparatuses, and non-transitory computer-readable medium described herein may further include operations, features, means, or instructions for transmitting a request that indicates a requested number of REs per RE block.

In some examples of the method, apparatuses, and non-transitory computer-readable medium described herein, receiving the control signaling indicating the RE block configuration may include operations, features, means, or instructions for receiving the control signaling indicating the RE block configuration that indicates the number of REs that may be the same as the requested number of REs per RE block.

In some examples of the method, apparatuses, and non-transitory computer-readable medium described herein, receiving the control signaling indicating the RE block configuration may include operations, features, means, or instructions for receiving the control signaling indicating the RE block configuration that indicates the number of REs that may be different than the requested number of REs per RE block.

In some examples of the method, apparatuses, and non-transitory computer-readable medium described herein, transmitting the request may include operations, features, means, or instructions for transmitting the request that indicates the requested number of REs per RE block based on a requested MCS or a configured MCS.

In some examples of the method, apparatuses, and non-transitory computer-readable medium described herein, transmitting the request may include operations, features, means, or instructions for transmitting the request that indicates the requested number of REs per RE block based on a requested modulation constellation or a configured modulation constellation.

In some examples of the method, apparatuses, and non-transitory computer-readable medium described herein, transmitting the request may include operations, features, means, or instructions for transmitting the request that indicates the requested number of REs per RE block based on a requested frequency allocation or a frequency allocation corresponding to the resource allocation indicated in the grant.

In some examples of the method, apparatuses, and non-transitory computer-readable medium described herein, transmitting the request may include operations, features, means, or instructions for transmitting the request that indicates the requested number of REs per RE block based on a wireless channel condition, a delay spread, a doppler spread, or any combination thereof.

Some examples of the method, apparatuses, and non-transitory computer-readable medium described herein may further include operations, features, means, or instructions for receiving the index modulated transmission that may be spread in a frequency domain over a set of subcarriers, each subcarrier of the set of subcarriers corresponding to a respective data location in each RE block of a set of RE blocks within the resource allocation.

Some examples of the method, apparatuses, and non-transitory computer-readable medium described herein may further include operations, features, means, or instructions for receiving the index modulated transmission that may be spread in a time domain over a set of symbols within the resource allocation.

In some examples of the method, apparatuses, and non-transitory computer-readable medium described herein, the monitoring further may include operations, features, means, or instructions for performing energy detection within the resource allocation to detect a respective location of a data or control RE in each RE block of a set of RE blocks within the resource allocation, estimating a number of one or more transmit antennas utilized by a transmitter to transmit the index modulated transmission within the set of RE blocks, identifying a number of transmitted bits for the index modulated transmission within the resource allocation based on the estimated number of one or more transmit antennas, and decoding the index modulated transmission from the set of RE blocks based on the identified number of transmitted bits within the resource allocation and the detected respective locations of the data or control REs in each RE block of the set of RE blocks within the resource allocation.

A method of wireless communications by a base station is described. The method may include transmitting, to a UE, control signaling indicating a RE block configuration that indicates a number of REs per RE block; transmitting a grant indicating a resource allocation; and transmitting, based on the RE block configuration, an index modulated transmission within a data or control RE within the resource allocation and skipping transmitting within at least one empty RE within the resource allocation.

An apparatus for wireless communications by a base station is described. The apparatus may include a processor, memory coupled with the processor, and instructions stored in the memory. The instructions may be executable by the processor to cause the apparatus to transmit, to a UE, control signaling indicating a RE block configuration that indicates a number of REs per RE block; to transmit a grant indicating a resource allocation; and to transmit, based on the RE block configuration, an index modulated transmission within a data or control RE within the resource allocation and skipping transmitting within at least one empty RE within the resource allocation.

Another apparatus for wireless communications by a base station is described. The apparatus may include means for transmitting, to a UE, control signaling indicating a RE block configuration that indicates a number of REs per RE block; means for transmitting a grant indicating a resource allocation; and means for transmitting, based on the RE block configuration, an index modulated transmission within a data or control RE within the resource allocation and skipping transmitting within at least one empty RE within the resource allocation.

A non-transitory computer-readable medium storing code for wireless communications by a base station is described. The code may include instructions executable by a processor to transmit, to a UE, control signaling indicating a RE block configuration that indicates a number of REs per RE block; to transmit a grant indicating a resource allocation; and to transmit, based on the RE block configuration, an index modulated transmission within a data or control RE within the resource allocation and skipping transmitting within at least one empty RE within the resource allocation.

In some examples of the method, apparatuses, and non-transitory computer-readable medium described herein, transmitting the grant further may include operations, features, means, or instructions for transmitting the grant scheduling the UE to operate in a full-duplex mode and to transmit an uplink transmission within the resource allocation, and receiving the uplink transmission within the resource allocation.

Some examples of the method, apparatuses, and non-transitory computer-readable medium described herein may further include operations, features, means, or instructions for receiving a request that indicates a requested number of REs per RE block.

In some examples of the method, apparatuses, and non-transitory computer-readable medium described herein, transmitting the control signaling indicating the RE block configuration may include operations, features, means, or instructions for transmitting the control signaling indicating the RE block configuration that indicates the number of REs that may be the same as the requested number of REs per RE block.

In some examples of the method, apparatuses, and non-transitory computer-readable medium described herein, transmitting the control signaling indicating the RE block configuration may include operations, features, means, or instructions for transmitting the control signaling indicating the RE block configuration that indicates the number of REs that may be different than the requested number of REs per RE block.

In some examples of the method, apparatuses, and non-transitory computer-readable medium described herein, receiving the request may include operations, features, means, or instructions for receiving the request that indicates the requested number of REs per RE block based on a requested MCS or a configured MCS.

In some examples of the method, apparatuses, and non-transitory computer-readable medium described herein, receiving the request may include operations, features, means, or instructions for receiving the request that indicates the requested number of REs per RE block based on a requested modulation constellation or a configured modulation constellation.

In some examples of the method, apparatuses, and non-transitory computer-readable medium described herein, receiving the request may include operations, features, means, or instructions for receiving the request that indicates the requested number of REs per RE block based on a requested frequency allocation or a frequency allocation corresponding to the resource allocation indicated in the grant.

In some examples of the method, apparatuses, and non-transitory computer-readable medium described herein, receiving the request may include operations, features, means, or instructions for receiving the request that indicates the requested number of REs per RE block based on a wireless channel condition, a delay spread, a doppler spread, or any combination thereof.

Some examples of the method, apparatuses, and non-transitory computer-readable medium described herein may further include operations, features, means, or instructions for transmitting the index modulated transmission that may be spread in a frequency domain over a set of subcarriers, each subcarrier of the set of subcarriers corresponding to a respective data location in each RE block of a set of RE blocks within the resource allocation.

In some examples of the method, apparatuses, and non-transitory computer-readable medium described herein, transmitting the index modulated transmission may include operations, features, means, or instructions for transmitting the index modulated transmission that may be spread in a time domain over a set of symbols within the resource allocation.

In some examples of the method, apparatuses, and non-transitory computer-readable medium described herein, transmitting the index modulated transmission may include operations, features, means, or instructions for identifying a number of bits to include within the index modulated transmission based on a number of transmit antennas to be utilized for transmitting the index modulated transmission, a modulation constellation, a number of subcarriers within each RE block, and the resource allocation, index modulating input bits to generate a modulated transmission based on the identified number of bits and the modulation constellation, and power boosting, based on the number of REs per RE block, the modulated transmission at a respective location of a data or control RE in each RE block of a set of RE blocks within the resource allocation to generate the index modulated transmission, where the index modulated transmission may be transmitted via at least one transmit antenna that corresponds to the number of transmit antennas.

DETAILED DESCRIPTION

Figure 1:
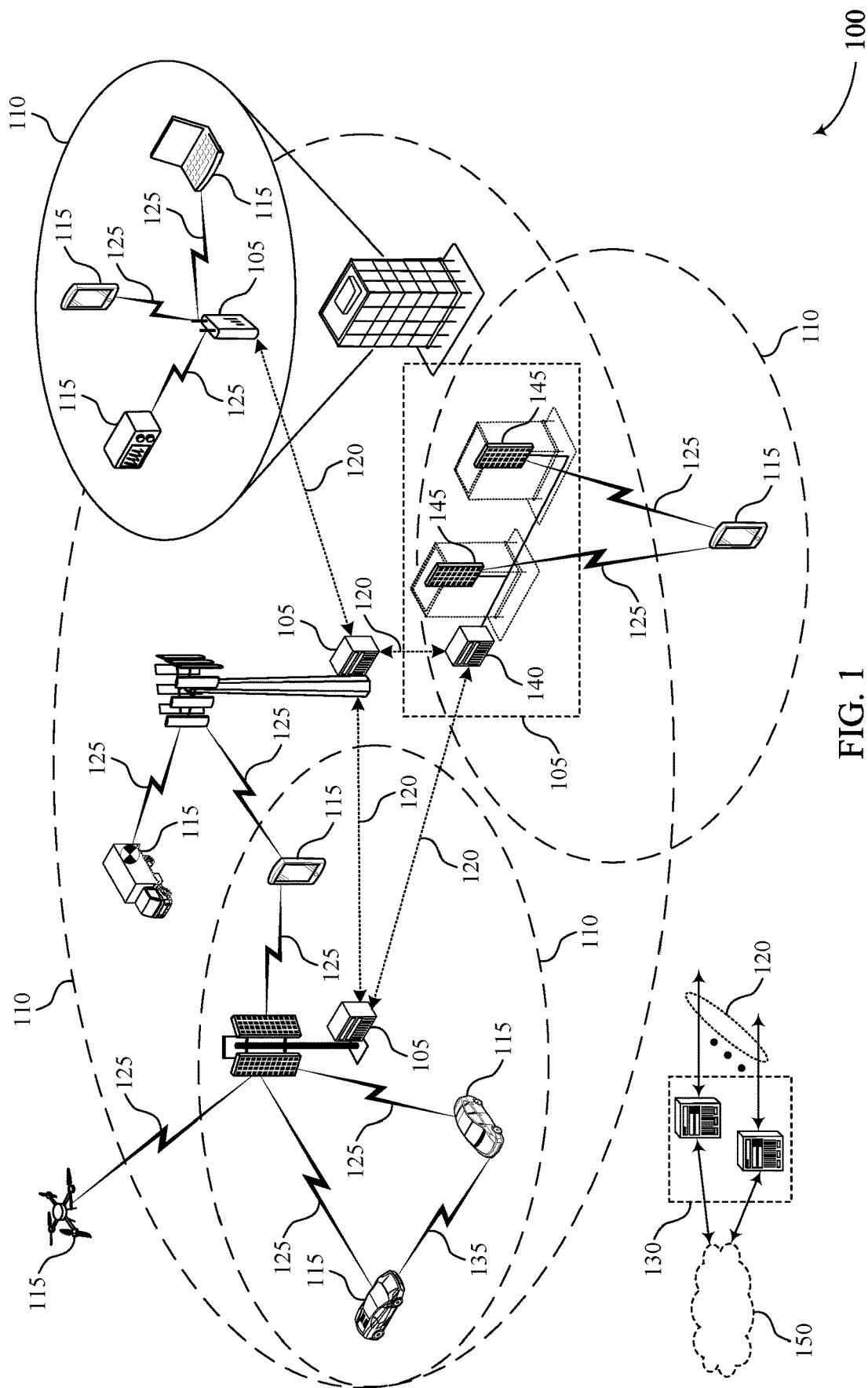
FIG. 1 illustrates an example of a system for wireless communications in accordance with aspects of the present disclosure.

To improve full-duplex operation, a user equipment (UE) and a base station may utilize index modulation for transmissions between the base station and the UE to improve throughput and provide a lower noise floor. A transmitter, such as the base station, may define blocks of resource elements (REs) for downlink transmissions. The transmitter may then transmit a power boosted index modulated signal at a data RE location within each RE block and may skip transmitting within the remaining one or more REs of each RE block. In some cases, the power boost may be a function of the number of REs per RE block and may be selected to keep the same amount of transmitted energy across that RE block. The transmitter may configure a receiver, such as the UE, to indicate the number of REs per RE block (e.g., $N_{RE}$). The UE may use this information to perform energy detection for determining which one or more REs within an RE block include the power boosted index modulated transmission and which one or more REs within the RE block are each an empty RE (e.g., the remaining REs where transmission is skipped). In some cases, the UE may use the one or more empty REs for performing noise estimation and may request the number of REs to include in an RE block (e.g., for a future transmission).

As the demand for wireless data increases, wireless systems may support an efficient use of resources (e.g., time resources, frequency resources, etc.) for communications between wireless devices in the wireless system. For example, one or more wireless devices (e.g., one or more UEs) in the wireless systems may support full-duplex communications that includes concurrently transmitting and receiving signals over a same time slot at a wireless device. Based on using the full-duplex communications, a wireless device may increase (e.g., double) a throughput gain (e.g., by communicating two data streams at a same time) and may also reduce a transfer latency (e.g., for time-critical services). The wireless device configured for the full-duplex communications (e.g., a full-duplex UE) may communicate concurrently on uplink and downlink communication links using a same set of radio resources. However, wireless devices operating in a full-duplex mode (e.g., for full-duplex communications) may produce and be affected by an interference, such as a self-interference from a signal transmitted by the device (e.g., an uplink signal) affecting a signal concurrently received by the device (e.g., a downlink signal). In some examples, the transmitted signal may interfere with the received signal if the transmitted signal is transmitted on time-frequency resources that at least partially overlap with time-frequency resources on which the received signal is received, thereby increasing a noise floor of the wireless device and resulting in inefficient utilization of allocated resources by the wireless device.

Accordingly, a wireless communications system (e.g., a New Radio (NR) system) may implement techniques to increase the efficiency of allocated resources and to mitigate noise. In some cases, the network may allocate an amount of transmit power to a transmitting device for the transmission of bits (e.g., information bits, signaling, etc.) according to a low coding rate. As such, extraneous power may result from changing coding rates and/or using different procedures for transmitting/receiving the bits (e.g., such as index modulation that includes reconfiguring extraneous REs from a rate matching procedure into empty REs that do not contain any bits or signaling). In some cases, the transmitting device may use the extraneous power to boost a transmit power (e.g., increase transmit power) of REs containing bits (e.g., at low coding rates, low signal-to-noise ratios (SNRs) may be experienced).

Boosting the transmit power of the REs that contain the bits may mitigate degradation based on the boosted transmission experiencing less impact from noise. In some cases, the transmitting device may leave extraneous REs empty, and the receiving device may use the empty REs to perform noise estimation. The transmitter may use a minimal transmit power for transmitting the empty REs (e.g., to allocate a bulk of an allocated transmit power for the REs carrying the bits). When boosting the transmit power of the REs containing bits (e.g., as part of the index modulation procedure), the base station may transmit control signaling to the UE that includes an RE block configuration indicating the number of REs per RE block ($N_{RE}$) (e.g., the control signaling may include an indication of a predefined index modulation RE block configuration), and the UE may identify the location of the REs containing the bits and receive the REs containing the bits based in part on this control signaling and the indication of the number of REs per RE block.

Aspects of the disclosure are initially described in the context of wireless communications systems. Additionally, aspects of the disclosure are illustrated through an additional wireless communications system, a communications configuration, a transmit chain, a receive chain, and a process flow. Aspects of the disclosure are further illustrated by and described with reference to apparatus diagrams, system diagrams, and flowcharts that relate to full-duplex index modulation.

FIG. 1 illustrates an example of a wireless communications system 100 that supports full-duplex index modulation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, an RE may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems (e.g., next generation wireless networks, 5G networks, NR, etc.), ultra-high data rates and a wide scope of application scenarios may be expected to be supported. Accordingly, wireless full-duplex (FD) communications is an emerging technique and may be capable of doubling the link capacity that can accommodate the ultra-high data rates and wide scope of application scenarios. The main idea behind wireless full duplex may include enabling radio network nodes to transmit and receive simultaneously on a same frequency band and at a same time slot. This simultaneous communication using the same frequency band at the same time may contrast with conventional operations (e.g., half-duplex operation, non-full-duplex operations, etc.) where transmission and reception either differ in time, in frequency, or both. A full-duplex network node, such as a base station 105 in a cellular network, may communicate simultaneously in uplink and downlink with two half-duplex terminals (e.g., half-duplex UEs 115) using the same radio resources (e.g., same time-frequency resources). Another typical wireless full-duplex application scenario may include one relay node that can communicate simultaneously with an anchor node and a mobile terminal in a one-hop scenario or with two other relay nodes in a multi-hop scenario. It is expected that by doubling each single-link capacity, full-duplexing may increase the system throughput in diverse applications in wireless communication networks and may also reduce a transfer latency for time sensitive services.

Besides the above described scenarios, a new emerging scenario may include one UE 115 (e.g., a full-duplex-capable UE 115) that is capable of simultaneous transmission and reception using a same time-frequency radio resource (e.g., working in self-full-duplex mode). However, rather than the above described scenarios where network throughput may be increased but a single-UE throughput may not be increased, with the full-duplex-capable UE 115, a single-UE aggregated downlink and uplink throughput may be increased. Additionally, the full-duplex UE 115 (e.g., full-duplex-capable UE 115) may increase single-UE aggregated downlink and uplink throughput for cases when both downlink and uplink traffics are high for a single user. In some cases, enabling full-duplex transmissions may include a capability of canceling a strong self-interference from downlink to uplink at the full-duplex UE 115. For example, current full-duplex radio designs may suppress up to 110 dB of such self-interference (e.g., by combining the technologies of beamforming, analog cancellation, digital cancellation, antenna cancellation, etc.).

In some cases, full-duplex capabilities may cause different interferences based on the simultaneous communications occurring in different directions. For example, a full-duplex base station 105 may communicate with two non-full-duplex UEs 115 using a same set of radio resources (e.g., time-frequency resources), where a first non-full-duplex UE 115 transmitting a signal in an uplink may generate inter-UE interference to a second non-full-duplex UE 115 receiving a signal in a downlink from the full-duplex base station 105. Additionally or alternatively, for a full-duplex UE 115, a transmitted signal using an uplink antenna (e.g., for transmitting signals to a base station 105) may cause a self-interference on a received signal at a downlink antenna (e.g., for receiving signals from the same or a different base station 105). For example, the self-interference may include transmitter leakage from the uplink antenna(s) to the downlink antenna(s) based on transmission and reception by the full-duplex UE 115 occurring within a common time/frequency resource, which can cause a high noise floor at the full-duplex UE 115. In some examples, the transmitted signal may interfere with the received signal if the transmitted signal is transmitted on time-frequency resources that at least partially overlap with time-frequency resources on which the received signal is received, thereby increasing a noise floor of the wireless device and resulting in inefficient utilization of allocated resources by the wireless device.

Mitigating the self-interference may depend on different factors such as a transmission power of the full-duplex UE 115, an uplink transmission bandwidth, etc. Accordingly, a scheduling base station 105 may signal for the full-duplex UE 115 to adjust a transmission power or to use a specific uplink transmission bandwidth to mitigate the self-interference. For example, the full-duplex UE 115 may transmit a channel state information (CSI) report to the base station 105 (e.g., based on measuring CSI reference signals (CSI-RSs) received from the base station 105) to enable the base station 105 to determine mitigation techniques for the self-interference at the full-duplex UE 115. Additionally or alternatively, the base station 105 may use TDD and FDD communications to avoid this noise floor. However, the cost of using TDD/FDD communications may include the use of additional spectrum (e.g., higher resource cost) or may lower throughput. For example, when using full-duplex communications, the throughput gain from the full-duplex communications may be twice as high (e.g., doubled) than when using TDD communications (e.g., depending on a TDD configuration used).

In some cases, a wireless communications system (e.g., an NR system) may implement techniques to increase the efficiency of allocated resources and mitigate noise from transmitted signals on received signals (e.g., the increased noise floor). In some examples, a wireless device may perform rate matching for a transmitted signal. Rate matching may be an example of a channel coding technique that includes repeating or puncturing bits of a channel according to a configured rate. A rate may indicate a number of repetitions for transmitting a signal, where a lower rate may correspond to a higher number of repetitions performed. For example, a rate of 1/4 may result in four (4) repetitions of a bit, and a rate of 1/3 may result in three (3) repetitions of a bit. However, in some cases, a transmitting device may produce extraneous resource elements after rate matching. For example, a transmitting device may perform rate matching according to a rate of 1/3 that results in multiple extraneous resources elements (e.g., five (5) extraneous resource elements) than were allocated for another rate that is less than a 1/3 rate matching procedure.

Accordingly, the UE 115 and the base station 105 may utilize index modulation (e.g., IM) to mitigate the self-interference stemming from the full-duplex communications and to reconfigure extraneous REs from a rate matching procedure into REs not containing any signaling (e.g., empty resource elements). The index modulation may include techniques based on encoding a transmitted antenna (e.g., an antenna used for transmitting data) and one or more REs used for transmitting data (e.g., downlink data, uplink data, sidelink data, etc.). In some cases, a transmitting device (e.g., a UE 115, a base station 105, etc.) may transmit information to a receiving device (e.g., a UE 115, a base station 105, etc.) using the index modulation. Performing the index modulation may include the transmitting device selecting a set of REs (e.g., in an RE block) over which to transmit a first portion of the data or information (e.g., active REs) and not transmitting information over non-active REs (e.g., the non-active REs may be considered empty REs), where a configuration or pattern of the active REs indicates a second portion of the data or information.

Additionally, the index modulation (e.g., with reconfiguring REs to not contain any signaling) may allow a transmitting device to boost (e.g., increase) a transmit power (e.g., and a resulting receiving power at a receiving device) of the resource elements that contain the signaling (e.g., information bits, signaling bits, etc.) to improve noise estimation at a receiving device. An amount that a transmit power for each RE containing the signaling is boosted (e.g., a boosting factor of each RE containing bits) may be determined by a number of REs used for the index modulation procedure. In some cases, the receiving device may estimate a noise covariance (e.g., such as a noise covariance matrix, $R_{nn}$) during the empty REs which may simplify and improve the noise covariance estimation. Subsequently, the receiving device may use an energy detector to find the transmitted RE(s) (e.g., active REs containing the bits) and a maximum likelihood (ML) detector to find the transmitted antenna.

In some cases, the transmitting device may configure the number of REs used to transmit/carry the signaling bits in the frequency domain and in the time domain (e.g., between symbols). The number of bits that will be transmitted may be given by Equation 1 below.

$$\log_2 N_{Tx} + \frac{N_{SC}}{N_{RE}} \log_2 N_{RE} + \frac{N_{SC}}{N_{RE}} \log_2 M_{constellation} \qquad (1)$$

$N_{Tx}$ may represent a number of transmitting antennas at the transmitting device (e.g., a base station 105, a UE 115, etc.), $N_{SC}$ may represent a number of subcarriers in a TTI used for transmitting the signaling (e.g., an OFDM slot, a symbol, etc.), $N_{RE}$ may represent a number of REs used for the index modulation (e.g., active REs carrying information, signaling, bits, etc. and the empty REs), and $M_{constellation}$ may represent a size of a considered constellation diagram for encoding/transmitting the signaling. Additionally, the transmitting device may be allocated a total transmission power for transmitting the signaling, and to keep a same total transmitted energy across the REs when using the index modulation, the transmitting device may apply a $\sqrt{N_{RE}}$ power boost to the REs used for transmitting the signaling (e.g., and skipping the empty REs).

Wireless communications system 100 may support efficient techniques for combining the index modulation with full-duplex communications, thereby achieving increased throughput (e.g., as compared with TDD communications) and having a lower noise floor due to the power boost applied to keep a same total transmitted energy. For example, a base station 105 (e.g., or another transmitting device) may determine a number of REs to use for an index modulation procedure for transmitting downlink information to a full-duplex UE 115 (e.g., or another receiving device capable of full-duplex communications) according to an index modulation procedure. Accordingly, the base station 105 may then transmit an indication of the determined number of REs (e.g., in control signaling) to the UE 115, and the UE 115 may determine which one or more REs are carrying the downlink information based in part on the indication of the determined number of REs. Based on the techniques described herein (e.g., full-duplex index modulation), the UE 115 may have a higher chance of detecting the REs carrying the downlink information (e.g., improve detection) in low coverage scenarios (e.g., low SNRs), and the base station 105 may create subcarriers (e.g., the one or more empty REs) for noise covariance ($R_{nn}$) estimation by the UE 115.

Figure 2:
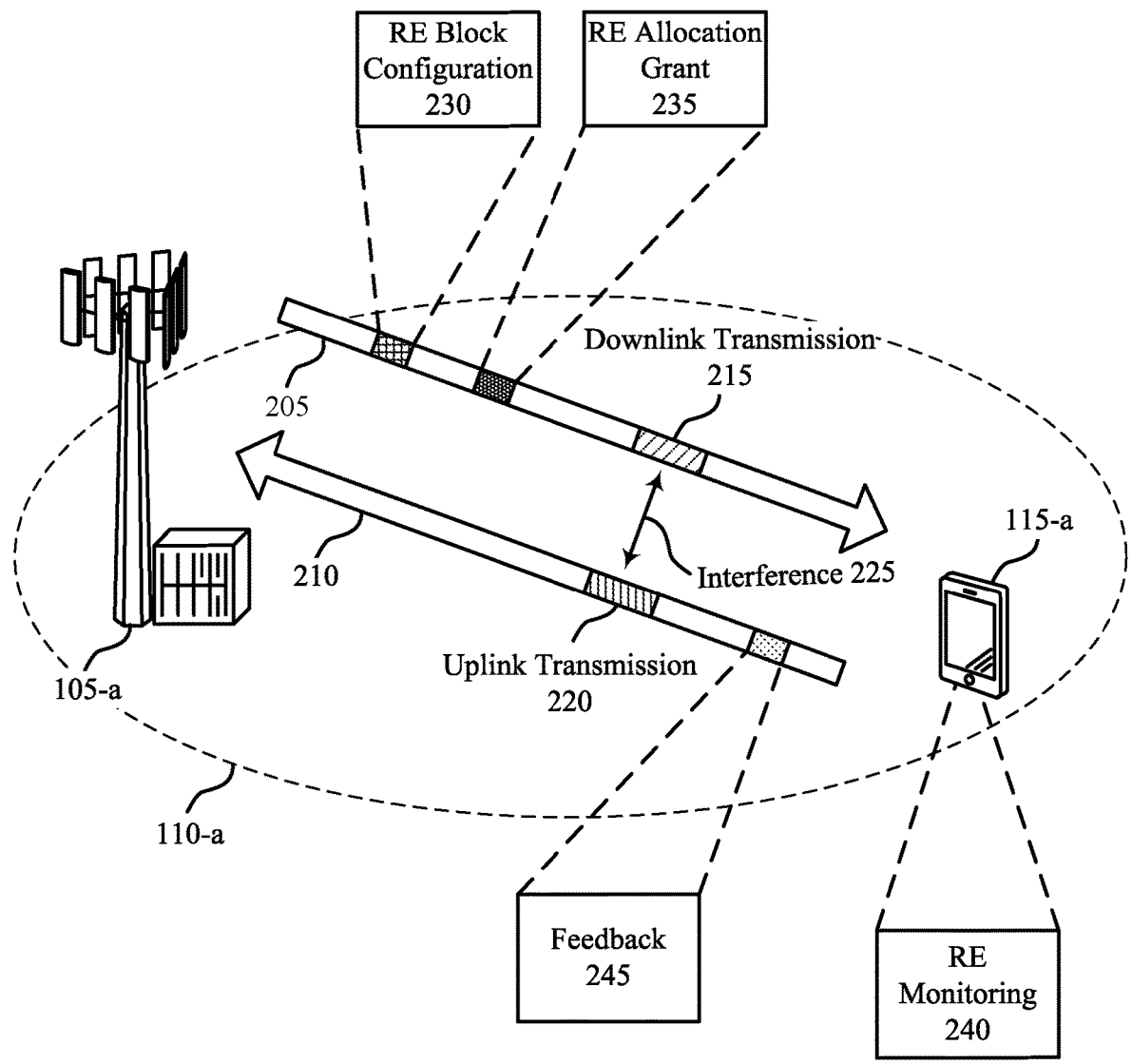
FIG. 2 illustrates an example of a wireless communications system in accordance with aspects of the present disclosure.

FIG. 2 illustrates an example of a wireless communications system 200 that supports full-duplex index modulation in accordance with aspects of the present disclosure. In some examples, wireless communications system 200 may implement aspects or may be implemented by aspects of wireless communications system 100. Wireless communication system 200 may include a base station 105-$a$ and a UE 115-$a$, which may be examples of corresponding base stations 105 and UEs 115, respectively, as described with reference to FIG. 1. While base station 105-$a$ and UE 115-$a$ are shown in the example of FIG. 2, it is to be understood that base station 105-$a$ may be considered any transmitting device in an index modulation procedure, and UE 115-$a$ may be considered any receiving device in the index modulation procedure. In some cases, base station 105-$a$ and UE 115-$a$ may communicate (e.g., via the index modulation procedure) on resources of a carrier 205 and a carrier 210 (e.g., in some cases, carrier 205 and carrier 210 may be a same carrier).

Additionally, UE 115-$a$ may be described as a full-duplex-capable UE 115 or full-duplex UE 115 as described above with reference to FIG. 1, where UE 115-$a$ is capable of simultaneously receiving downlink traffic and transmitting uplink traffic with base station 105-$a$ on a same set of frequency resources of carrier 205 and carrier 210 at a same given time (e.g., over a same given time slot, TTI, etc.). Based on using the full-duplex communications, a wireless device may double a throughput gain (e.g., by communicating two data streams at a same time) and may also reduce a transfer latency (e.g., for time-critical services). The wireless device configured for the full-duplex communications (e.g., UE 115-$a$) may communicate concurrently on a downlink communication link (e.g., carrier 205) and an uplink communication link (e.g., carrier 210) using a same set of radio resources (e.g., time and/or frequency resources).

However, wireless devices operating in a full-duplex mode (e.g., for full-duplex communications) may produce and be affected by an interference, such as interference from a signal transmitted by the device (e.g., an uplink signal) affecting a signal concurrently received by the device (e.g., a downlink signal). For example, UE 115-$a$ may receive a downlink transmission 215 on carrier 205 at the same time as an uplink transmission 220 is transmitted on carrier 210, thereby creating an interference 225 (e.g., a self-interference of uplink transmission 220 affecting UE 115-$a$ correctly receiving downlink transmission 215).

In some cases, base station 105-a and UE 115-a may utilize an index modulation procedure to mitigate the interference 225. As part of the index modulation procedure, base station 105-a may transmit downlink transmission 215 to UE 115-a, where downlink transmission 215 spans a set of active REs (e.g., of carrier 205) in an RE block. Additionally, each active RE may span a set of frequencies (e.g., a subcarrier) and a duration of time within the RE block. For example, base station 105-a may transmit an index modulated transmission via the active REs that are spread in a frequency domain across multiple subcarriers, where each of the multiple subcarriers corresponds to a respective data location in each RE block. Additionally or alternatively, base station 105-a may transmit the index modulated transmission spread across multiple symbols (e.g., or different TTI durations) in the time domain.

Subsequently, downlink transmission 215 may convey information (e.g., data, signaling, etc.) to UE 115-a using the index modulation procedure (e.g., OFDM index modulation (OFDM-IM)) via the active REs. When using the index modulation procedure, a first portion of the information (e.g., one or more data bits) may be explicitly signaled over the active REs chosen by base station 105-a for the index modulation procedure. For instance, each signal transmitted over a respective active RE may convey X bits of information, where there are K active REs. As such, the total number of information bits in the first portion of the information may be K*X information bits.

Additionally, when using the index modulation procedure, the configuration or pattern of REs may convey a second portion of the information (e.g., one or more data bits). Generally, the index modulation procedure may increase spectral efficiency by conveying information through REs or subcarriers chosen to be active. Additionally, the REs that are not active REs (e.g., non-activated subcarriers) may be considered empty REs (e.g., or tone reservation REs) within the RE block. The empty REs may not include signaling from base station 105-a and may not carry information to UE 115-a (e.g., in conventional schemes).

When determining the number of REs (e.g., $N_{RE}$) for the index modulation procedure (e.g., including both active REs and empty REs), base station 105-a may use different factors. For example, a data location (e.g., which one or more REs to use for the active REs, the number of active REs, etc.) may be any desired integer as long as the coding rate is smaller than one (1). Base station 105-a may spread the index modulation procedure in the frequency domain to a number of subcarriers and/or in the time domain in several TTIs (e.g., OFDM symbols, slots, etc.). Additionally, base station 105-a may configure the data locations (e.g., active REs) per MCS (e.g., each MCS has a corresponding $N_{RE}$), or per constellation (e.g., binary phase shift keying (BPSK), quadrature phase shift keying (QPSK), 64 quadrature amplitude modulation (QAM), 256 QAM, 1024 QAM, etc.), or per frequency allocation, or per channel conditions (e.g., delay spread, Doppler spread, time offset, etc.), or a combination thereof.

As described herein, after determining the active REs (e.g., and subsequent empty REs), base station 105-a may transmit an RE block configuration 230 to UE 115-a indicating the number of total REs (e.g., $N_{RE}$) per RE block used for the index modulation procedure and for transmitting downlink transmission 215 according to the index modulation procedure. In some cases, RE block configuration 230 may be a predefined index modulation RE block configuration that is predefined within UE 115-a, and UE 115-a identifies the predefined index modulation RE block configuration to use based on RE block configuration 230. For example, base station 105-a and UE 115-a may include a look-up table of different predefined index modulation RE block configurations, where base station 105-a indicates one of the predefined index modulation RE block configurations that is being used for the index modulation procedure via RE block configuration 230. Subsequently, base station 105-a may then transmit an RE allocation grant 235 to UE 115-a that indicates REs (e.g., RE blocks) for UE 115-a to monitor for and receive a downlink message (e.g., downlink transmission 215) and/or for UE 115-a to transmit an uplink message (e.g., uplink transmission 220).

Accordingly, UE 115-a may then monitor for and receive downlink transmission 215 and/or transmit uplink transmission 220 at a same time (e.g., with a reduced interference level for interference 225) based on the index modulation procedure and the received RE block configuration 230. In some examples, UE 115-a may perform an RE monitoring 240 based on RE block configuration 230 and RE allocation grant 235. For example, UE 115-a may use the indicated number of REs from RE block configuration 230 as part of performing RE monitoring 240 by performing an energy detection to identify which one or more REs in RE block(s) of the RE allocation are the active REs. For example, UE 115-a may identify the active REs based in part on the indicated number of REs and receive downlink transmission 215 via the active REs that can be spread in the frequency domain across multiple subcarriers (e.g., respective data locations in each RE block) within the RE allocation (e.g., from RE allocation grant 235) and/or across multiple symbols (e.g., or other TTI durations) within the RE allocation.

Additionally, as part of RE monitoring 240, UE 115-a may estimate (e.g., using an ML detector) a number of transmit antennas used by base station 105-a for transmitting the active REs in the RE block(s) based on the indicated number of REs from RE block configuration 230. Subsequently, UE 115-a may identify a number of transmitted bits based on the number of REs, the identified active REs, the number of transmit antennas, or a combination thereof, and may decode an index modulated transmission from base station 105-a (e.g., downlink transmission 215) based on the active REs and the identified number of transmit antennas. As such, a power boost used for the index modulated transmission (e.g., as determined and used by base station 105-a) may enable UE 115-a to fully and correctly receive downlink transmission 215 while also concurrently transmitting uplink transmission 220 based on a low noise floor caused by uplink transmission 220 (e.g., as a result of the used power boost).

In addition to receiving information from base station 105-a via the index modulated transmission on the active REs, UE 115-a may use the one or more empty REs transmitted as part of the index modulation procedure to measure channel conditions for the communications with base station 105-a. For example, UE 115-a may use the one or more empty REs for a noise covariance ($R_{nn}$) estimation. Subsequently, UE 115-a may transmit feedback 245 to base station 105-a based on the measured channel conditions. Based on feedback 245, base station 105-a may adjust one or more transmission parameters for subsequent communications with UE 115-a.

In some cases, a configured set of REs for the index modulation procedure may span multiple RE blocks. For example, for $N_{RE}$=2, the two REs may span a first RE block and a second RE block, where a first RE is the last RE of the first RE block and a second RE is the first RE of the second RE block. Accordingly, base station 105-a may transmit the index modulated transmission on the last RE of the first RE block or on the first RE of the second RE block. Subsequently, the RE not used for the index modulated transmission may be the empty RE for the index modulation procedure. For example, the empty RE may be the last RE of the first RE block if the first RE of the second RE block is used for the index modulated transmission, or the empty RE may be the first RE of the second RE block if the last RE of the first RE block is used of the index modulated transmission. Based on this configuration, base station 105-a may transmit the index modulated transmission in an active RE within one of the RE blocks and may skip transmitting in an empty RE within the other RE block (e.g., transmitting the index modulated transmission in the active RE and skipping transmission in the empty RE may not occur within a same RE block).

Additionally or alternatively, UE 115-a may transmit an indication (e.g., in feedback 245) of a requested number of REs (e.g., a preferred number of active REs) for base station 105-a to use for transmitting index modulated messages based on RE monitoring 240. For example, UE 115-a may determine a number of REs for base station 105-a to use based on a requested or configured MCS, a requested or configured frequency allocation, a requested or configured modulation constellation, or a combination thereof. Accordingly, base station 105-a may transmit downlink transmission 215 (e.g., or an additional or subsequent downlink message) based on the requested number of REs from UE 115-a. In some cases, base station 105-a may use the requested number of REs for index modulated downlink communications with UE 115-a or may use a different number of REs than requested by UE 115-a for the index modulated downlink communications with UE 115-a.

In some cases, using these techniques as described above, UE 115-a (e.g., the receiving device) may use full-duplex communications with a multiplexing scheme (e.g., OFDMA, SC-FDMA, etc.) for uplink communications and the index modulation procedure for downlink communications. Additionally, the boost used for the index modulation procedure may result in a low noise floor caused from the uplink transmission.

Figure 3:
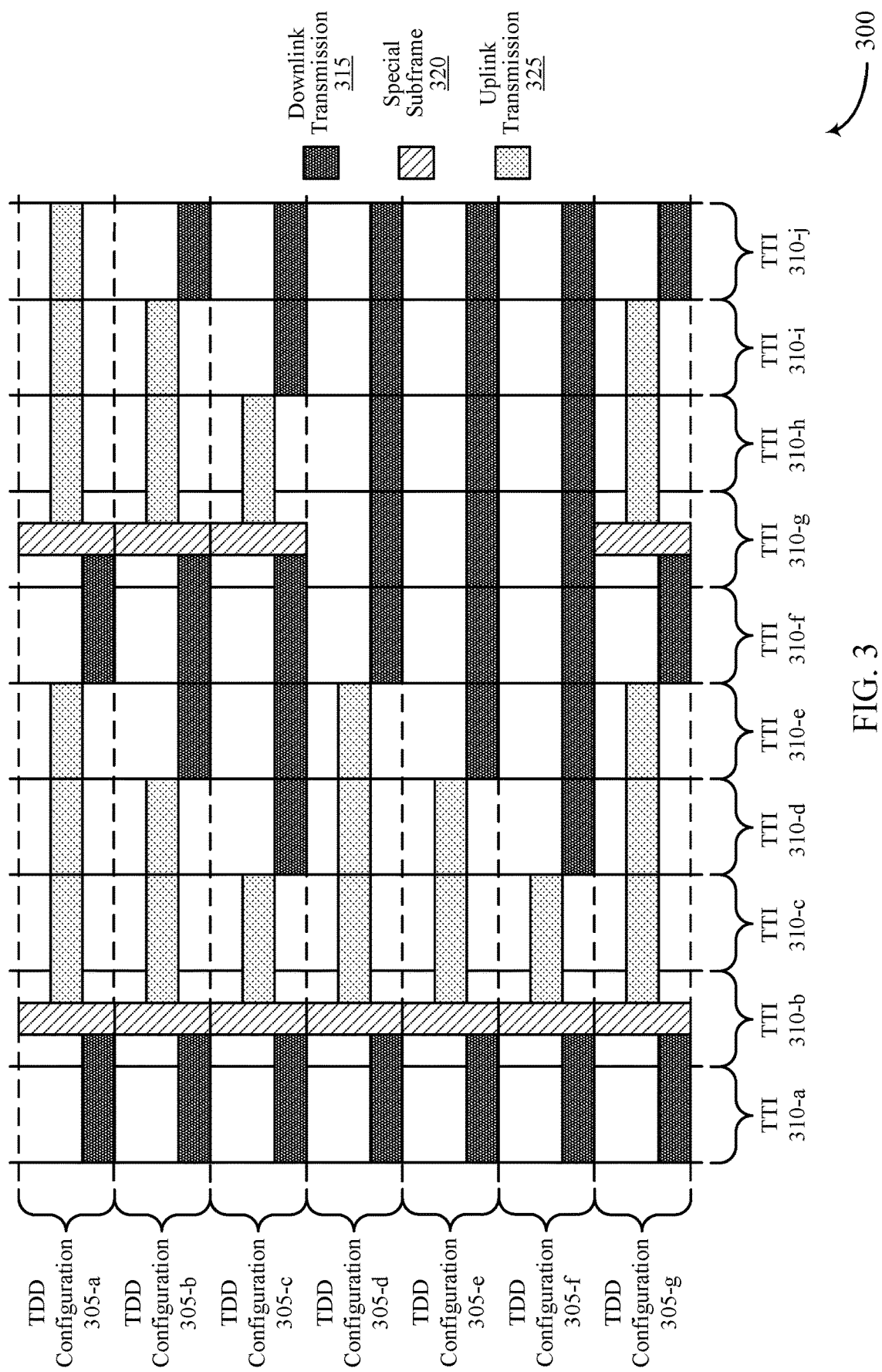
FIG. 3 illustrates an example of a communications configuration in accordance with aspects of the present disclosure.

FIG. 3 illustrates an example of a communications configuration 300 that supports full-duplex index modulation in accordance with aspects of the present disclosure. In some examples, communications configuration 300 may implement aspects of wireless communications systems 100 and/or 200. A base station 105 and a UE 115 may use communications configuration 300 for communications between each other.

Communication configuration 300 may include one or more possible TDD configurations 305 for the base station 105 and the UE 115 to use for their communications. For example, each TDD configuration 305 may include one or more TTIs 310 (e.g., subframes, slots, mini-slots, etc.) that are configured for at least a portion of either a downlink transmission 315, a special subframe 320 (e.g., a guard period or additional time, for example needed for transitioning between uplink and downlink communications), or an uplink transmission 325. Additionally, since the TDD configurations 305 include transmissions separated based on the TTIs 310, a downlink transmission 315 and an uplink transmission 325 may not coexist in a same TDD configuration 305 in a given TTI 310.

Accordingly, if the base station 105 and the UE 115 communicate according to one of the TDD configurations 305, an achievable throughput for TDD communications may be less than an achievable throughput for full-duplex communications. For example, in full-duplex communications, an uplink transmission 325 may be transmitted in a TTI 310 originally configured for only a downlink transmission 315, and a downlink transmission 215 may be transmitted in a TTI 310 originally configured for only an uplink transmission 325. That is, the UE 115 may receive a downlink transmission 315 and may transmit an uplink transmission 325 in a same TTI 310 regardless of which transmission direction the TTI 310 was originally configured for based on the TDD configuration 305. As such, the full-duplex communications may increase the throughput of communications (e.g., when compared with TDD communications) between the base station 105 and the UE 115 based on communicating more information (e.g., both a downlink transmission 315 and an uplink transmission 325) within a same TTI 310.

Figure 4:
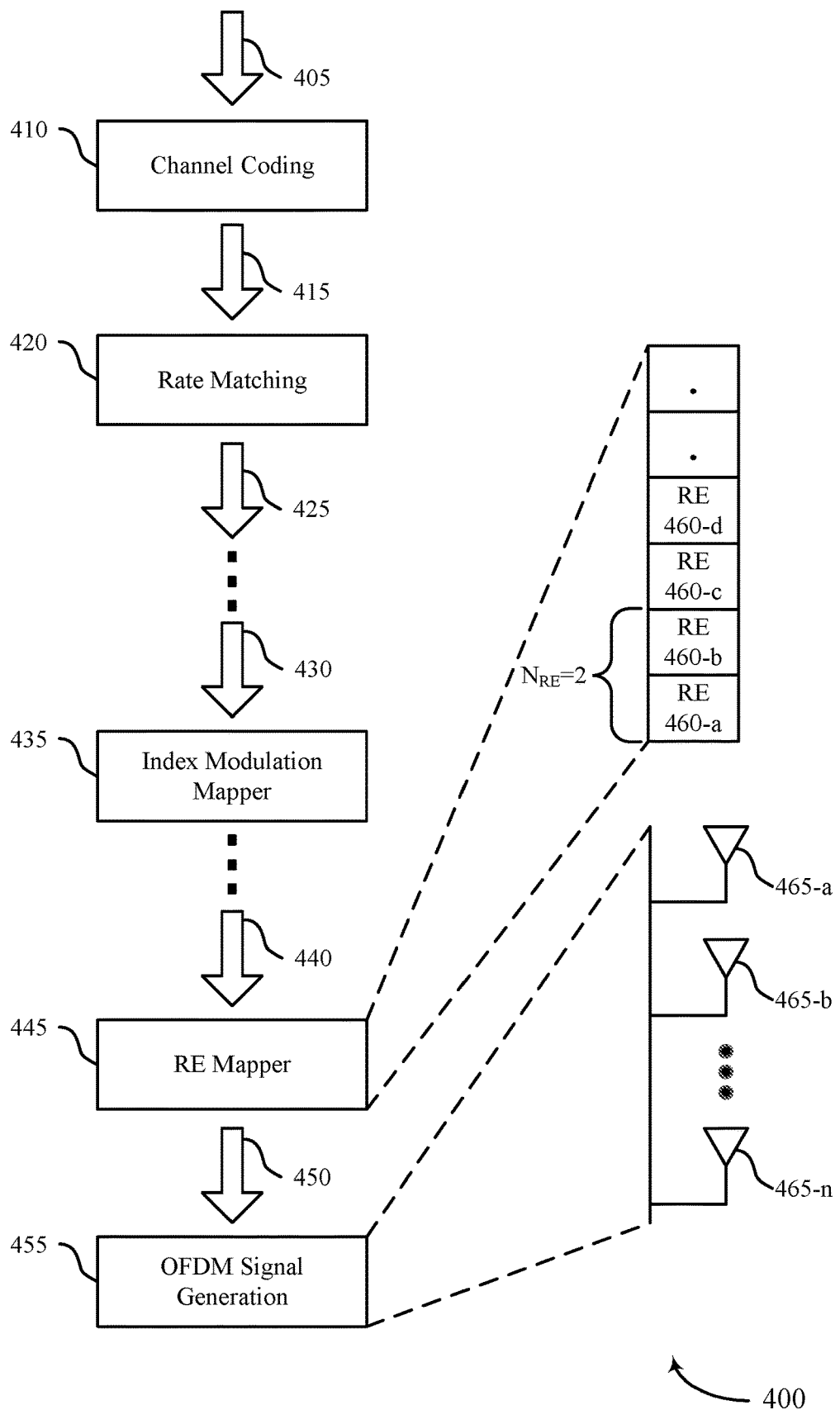
FIGS. 4 and 5 illustrate examples of transmission chains in accordance with aspects of the present disclosure.

FIG. 4 illustrates an example of a transmission chain 400 that supports full-duplex index modulation in accordance with aspects of the present disclosure. In some examples, transmission chain 400 may implement aspects or may be implemented by aspects of wireless communications systems 100, wireless communications system 200, or both. A base station 105 may use transmission chain 400 to arrange or configure a downlink transmission to a UE 115 according to an index modulation procedure as described herein, where the UE 115 is a full-duplex UE 115. Additionally or alternatively, any transmitting device (e.g., a base station 105, a UE 115, etc.) may use transmission chain 400 to configure a transmission to a receiving device (e.g., a UE 115, a base station 105, etc.) according to the index modulation procedure.

The transmission chain 400 may illustrate an example rate matching and resource mapping procedure. The base station 105, the UE 115, or both may perform the rate matching procedure, resource mapping procedure, or a combination thereof. For example, the described procedure may be performed by base stations 105, UEs 115, transmitting devices, and/or receiving devices as described with reference to FIGS. 1 through 3. Alternative examples of the following may be implemented, where some steps are performed in a different order than described or are not performed at all. In some cases, steps may include additional features not mentioned below, or further steps may be added.

Prior to transmitting bits (e.g., bits containing control information, data, or a combination thereof), a transmitting device (e.g., the base station 105) may perform a rate matching procedure via a circular buffer and resource mapping procedure. The procedure may start at 405 with input bits $c_0, c_1, \ldots, c_{N-1}$, and the input bits may be input to a channel coding module 410. Channel coding may include using a low-density parity-check (LDPC) code, turbo coding, a convolution code, etc. In some cases, the coding may be based on the network capability (e.g., LTE, 5G NR).

Out of the channel coding module 410 at 415, the transmitting device may gain the original bits multiplied by a repetition factor indicated by a coding rate, such as bits $d_0, d_1, \ldots, d_{3N-1}$. In some cases, the coding rate may be a designated coding rate and may be less than 1/3, such as 1/4. The lower the rate, the more repetitions that the transmitting device may gain for each bit. Due to the larger number of repetitions, the transmitting device may be allocated more REs and a higher transmission power for each RE to transmit the higher number of repetitions. In some cases, the higher number of repetitions associated with a coding rate less than 1/3 may not provide any additional coding gain while the allocation of resource may be large. In some cases, the resources associated with the low coding rate may be applied differently to gain an additional advantage.

To more efficiently utilize resources, the transmitting device may, in some examples, perform a rate matching procedure that utilizes a coding rate (e.g., $E_r$ may represent the coding rate) above a threshold. For example, the threshold may be a coding rate of 1/3, and the transmitting device may not use coding rates below 1/3 (e.g., a coding rate of 1/4). For example, the transmitting device may be allocated resources to perform rate matching according to a coding rate below 1/3, and the transmitting device may instead perform rate matching according to the threshold coding rate, or a coding rate above the threshold. Extraneous REs may result from the coding rate change. In some cases, the transmitting device may leave the extraneous REs empty. As such, no bits may be transmitted during the same number of REs as there are extraneous REs. In some resource mapping patterns, empty REs may be next to REs that contain bits.

In some cases, a receiving device may use the empty REs to perform noise estimation of thermal noise and interference of a channel such as a noise covariance estimation (e.g., $R_{nn}$). As the empty REs may be next to REs containing bits, the noise covariance estimation using the empty bits may provide an accurate and simple noise covariance estimation of the REs containing bits. In some cases, because the receiving device may perform noise covariance on each empty RE, the receiving device may gain a high number of samples of the noise on the channel to gain a more accurate estimate. A more accurate estimate of noise on the channel may be useful in some systems (e.g., systems operating under sub-6 GHz) that use a high number of receiving antennas (e.g., 4 receiving antennas) that may require a high number of samples to determine accurate noise estimates.

In some cases, noise estimation may be performed by performing measurements on demodulation reference signals (DMRSs). Additionally, the noise covariance estimation performed using empty REs may be combined with the channel estimation of DMRSs to determine more accurate channel conditions. In some cases, the noise covariance estimation may be used alone to efficiently determine channel conditions with low complexity. In some cases, a transmitting or receiving device may use the accurate noise estimation to whiten interferers that may be causing noise to mitigate the impact of interference such as decoding errors.

In some cases, an amount of power may have been allocated to the transmitting device for the transmission of bits according to the low coding rate. As such, extraneous power may result from changing the coding rates and leaving REs empty. In some cases, the transmitting device may use the extraneous power to boost REs containing bits (e.g., physical downlink shared channel (PDSCH) REs) because at low coding rates, low SNRs may be experienced. During equalization at some SNRs (e.g., very low SNRs), degradation may be experienced due to a noise term of channel estimation output being multiplied by a noise term of a PDSCH RE. In some cases, boosting the PDSCH REs may mitigate the degradation because the boosted transmission may experience less impact of noise.

For example, a transmitting device may input the encoded bits (e.g., bits $d_0, d_1, \ldots, d_{3N-1}$) into one or more rate matching modules 420. The rate matching modules 420 may perform one or more transformations on the bits. For example, at 425, the bits may be transformed to $e_0, e_1, \ldots,$ $$e_{E_r \times \frac{QAM + \log_2 N_{Tx} + \log_2 N_{RE}}{QAM} / N_{RE} - 1},$$

where $E_r$ is the coding rate, $N_{Tx}$ represents a number of transmitting antennas at the transmitting device (e.g., a base station 105, a UE 115, etc.), $N_{RE}$ represents a number of REs used for the index modulation (e.g., active REs and empty REs), and QAM represents size of a considered constellation diagram for encoding/transmitting the signaling.

At 430, the bits may further be transformed to $f_0, f_1, \ldots, f_{G-1}$ based on additional steps not shown. These $f_0, f_1, \ldots, f_{G-1}$ may then enter an index modulation mapper 435. The index modulation mapper 435 may take these input bits (e.g., $f_0, f_1, \ldots, f_{G-1}$) and may divide these input bits to QAM bits and to index modulation bits in serial order. The index modulation mapper 435 may then split the index modulation bits to antenna indices selection and RE selection. The data location and antenna index selection may be gray index modulated in each block of REs. Additionally, the index modulation mapper may use multi-level coding. Due to the index modulation, $\log_2 N_{RE} + \log_2 N_{Tx}$ bits may be added per $N_{RE}$ subcarriers, where $N_{Tx}$ represents a number of transmitting antennas at the transmitting device. These added bits may be translated directly to a lower coding rate based on Equation 2 below.

$$r_{new} = r_{old} \frac{\log_2 M}{\log_2 M + \log_2 N_{RE} + \log_2 N_{Tx}} \quad (2)$$

$r_{new}$ may represent the new, lower coding rate, $r_{old}$ may represent an initially configured coding rate (e.g., old coding rate), and M may represent the size of a considered constellation diagram for encoding/transmitting the signaling. Additionally, the index modulation mapper 435 may assume that the boosted signal is equivalent to the data not transmitted (e.g., for coding rates lower than 1/3, it may be the same due to the code repetition which is the same as signal boost).

At 440, the bits may be further transformed to $s_0, b_0, a_0, \ldots, s_{N_{SC}/N_{RS}}, b_{N_{SC}/N_{RE}}, a_{\log_2 N_{Tx}}$, where the transmitting device may transmit s bits and $N_{SC}$ represents a number of subcarriers in a TTI used for transmitting the signaling (e.g., an OFDM slot, a symbol, etc.). As part of the rate matching transformations, a boost factor (e.g., R) may be applied to the bits to boost the transmission power of the repeated bits. The boost factor may be any number greater than zero. In some cases, the boost factor may be an integer or a fraction. The boost factor may determine the number of empty REs and the transmission power boost applied to REs containing bits. In some cases, the larger the boost factor, the more REs that may remain empty and the larger the boost that may be applied to REs that contain bits.

To determine the mapping of the REs in an OFDM symbol, a transmitting device may input the boosted s bits (e.g., $s_0, \ldots, s_{N_{SC}/N_{RE}}$) into an RE mapper 445. RE mapper 445 may determine the placement of one or more REs 560 containing bits and one or more REs 560 that are the empty REs based on a number of REs ($N_{RE}$) to use for the index modulation procedure (e.g., a boost factor). Depicted is a set of REs 460 where frequency is shown vertically and each RE 460 may correspond to a different subcarrier within a TTI (e.g., an OFDM symbol period, a slot, etc.) that is shown horizontally. For example, an $N_{RE}$=2, as depicted in FIG. 4, may indicate that two (2) REs 460 may be associated with each one RE block that contains bits. Accordingly, REs 460-a and 460-b may be determined based on $N_{RE}=2$ such that one of the REs 460 carries bits and the other RE 460 is an empty RE.

RE mapper 445 may create a boosted signal with a predefined factor $\triangleq \sqrt{N_{RE}}$ and may keep silent subcarriers to maintain a total energy allocated for transmitting the signal. For different boosting factors, the coding rate may be kept the same by increasing the coding rate in an encoder of the transmitting device with the same boosting factor. Accordingly, RE mapper 445 may map $s_i$ boosted bits according to $b_i$. A first index modulation configuration (e.g., $b_0$) may indicate one or more bits ($s_{00}$) carried in a RE block that contains RE 460-a and RE 460-b (e.g., the RE block consists of RE 460-a and RE 460-b).

Accordingly, one option of the first index modulation configuration (e.g., $b_0=0$) may include RE 460-a (e.g., a first indexed RE 460 of a first RE block) carrying the bits ($s_{00}$) multiplied by a boosting factor of $\sqrt{2}$ (e.g., based on $N_{RE}=2$, such that the boosting factor is determined by $\sqrt{N_{RE}}=\sqrt{2}$) and RE 460-b (e.g., a second indexed RE 420 of the first RE block) being an empty RE (e.g., containing a '0'). Additionally or alternatively, another option of the first index modulation configuration (e.g., $b_0=1$) may include RE 460-b (e.g., the second indexed RE 460 of the first RE block) carrying the bits ($s_{00}$) multiplied by the boosting factor of $\sqrt{2}$ and RE 460-a (e.g., the first indexed RE 460 of the first RE block) being an empty RE (e.g., containing a '0'). Subsequent RE blocks may carry corresponding bits until $s_{N_{SC}/N_{RE}}$ bits are allocated to corresponding REs 460 in each RE block (e.g., a second RE block may contain a first indexed RE 460-c and a second indexed RE 460-d for a $b_1$ to transmit one or more bits, $s_{10}$). Additionally, the empty REs (e.g., silent subcarriers) may enable a receiving device to determine a large number of samples for $R_{nn}$ estimation. Table 1 below shows potential index modulation configurations for mapping $s_i$ boosted bits according to $b_i$ to different REs 460. It is noted that the following table is an example, and the table may continue in a like pattern for any number of REs indicated for a resource allocation in a grant.

TABLE 1

Mapping Bits to REs with $N_{RE} = 2$

| | $b_0$ | | $b_1$ | |
|---|---|---|---|---|
| RE 460 | $b_0 = 0$ | $b_0 = 1$ | $b_1 = 0$ | $b_1 = 1$ |
| RE 460-a | $\sqrt{2} * s_{00}$ | 0 | | |
| RE 460-b | 0 | $\sqrt{2} * s_{00}$ | | |
| RE 460-c | | | $\sqrt{2} * s_{10}$ | 0 |
| RE 460-d | | | 0 | $\sqrt{2} * s_{10}$ |

In some cases, a configured set of REs 460 for the index modulation procedure may span multiple RE blocks. For example, for $N_{RE}=2$, the two REs 460 may span a first RE block and a second RE block, where a first RE 460 is the last RE of the first RE block and a second RE 460 is the first RE of the second RE block. Accordingly, based on the $b_i$ value, the transmitting device may transmit the index modulated transmission on the last RE 460 of the first RE block or on the first RE 460 of the second RE block. Subsequently, the RE 460 not used for the index modulated transmission may be the empty RE for the index modulation procedure. For example, the empty RE may be the last RE 460 of the first RE block if the first RE 460 of the second RE block is used for the index modulated transmission, or the empty RE may be the first RE 460 of the second RE block if the last RE 460 of the first RE block is used of the index modulated transmission. Based on this configuration, the transmitting device may transmit the index modulated transmission in one of the RE blocks and may skip transmitting within the other RE block (e.g., transmitting the index modulated transmission and skipping transmission in the empty RE may not occur within a same RE block).

Additionally, the number of REs per RE block may be configured per MCS (e.g., each MCS has a corresponding $N_{RE}$), per constellation (e.g., BPSK, QPSK, QAM, etc.), per frequency allocation, based on channel conditions (e.g., delay spread, Doppler spread, time offset, etc.), or a combination thereof. Accordingly, the transmitting device may determine the number of REs to allocate to an RE block based on these factors for mapping the signal selectively to an RE in the RE block (e.g., with the power boost applied).

Following RE mapper 440, the mapped REs at 450 may be input to an OFDM signal generation component 455. The OFDM signal generation component 455 may generate the OFDM symbol according to the RE mapping that a transmitting device may transmit to a receiving device. Additionally, the OFDM signal generation component 455 may map the mapped REs to one or more transmit antennas 465 based on $a_0, \ldots, a_{\log_2 N_{Tx}}$ determined from the index modulation mapper 435. For example, the transmitting device may use one transmit antenna 465-a (e.g., or another single transmit antenna 465) to transmit an index modulated transmission (e.g., after going through the index modulation mapper 435 and the RE mapper 445), on all transmit antennas 465, or a combination thereof. Additionally, in some cases, the transmitting device may switch between transmit antennas 465 to transmit the index modulated transmission varying with time (e.g., per slot, symbol, subframe, etc.). For example, the transmitting device may switch between transmit antennas 465 based on a number of transmit antennas of the transmitting device (e.g., $N_{Tx}$), such that the transmitting device may switch between up to $N_{Tx}$ transmit antennas.

Figure 5:
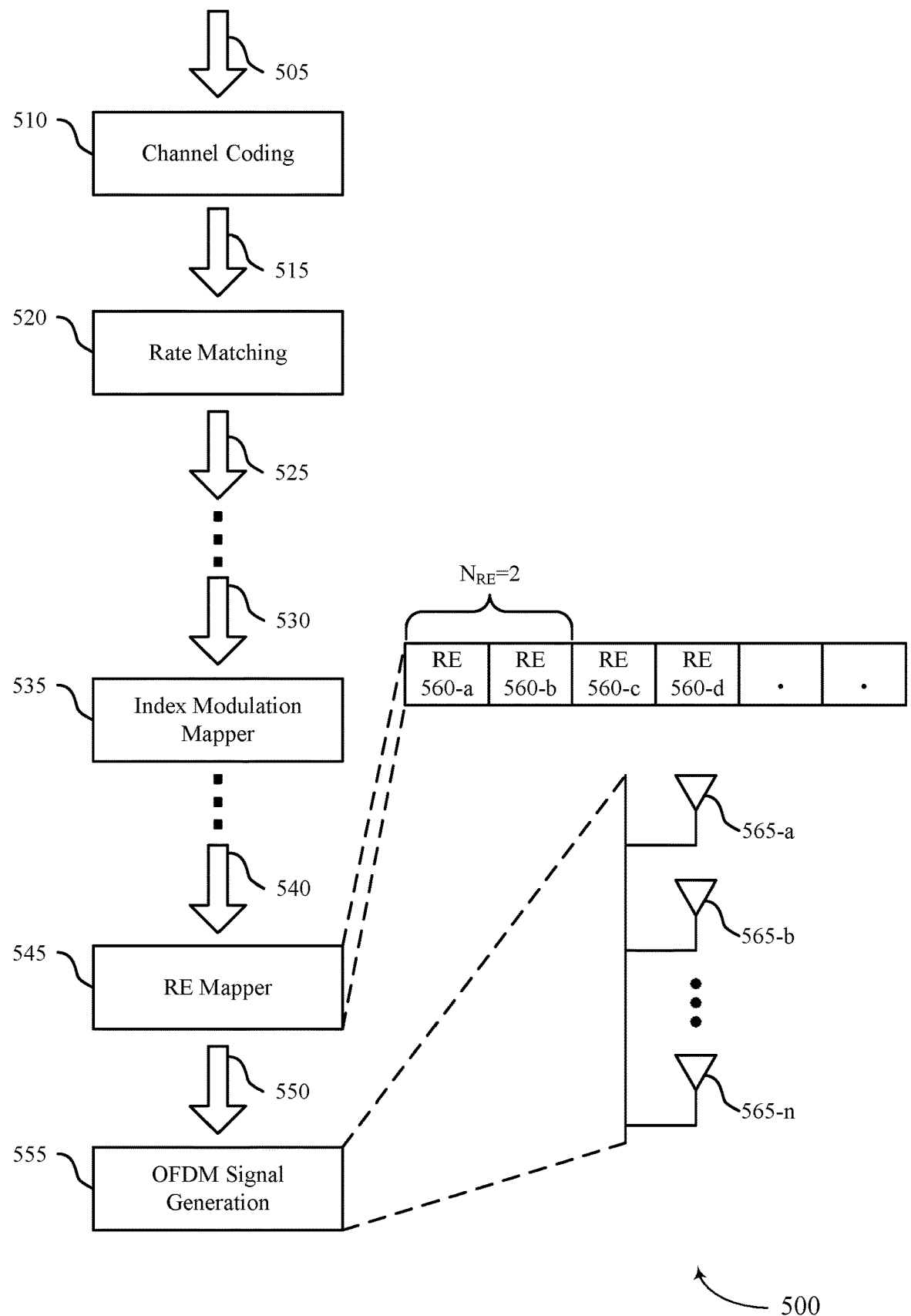

FIG. 5 illustrates an example of a transmission chain 500 that supports full-duplex index modulation in accordance with aspects of the present disclosure. In some examples, transmission chain 500 may implement aspects or may be implemented by aspects of wireless communications systems 100, wireless communications system 200, or both. A base station 105 may use transmission chain 500 to arrange or configure a downlink transmission to a UE 115 according to an index modulation procedure as described herein, where the UE 115 is a full-duplex UE 115. Additionally or alternatively, any transmitting device (e.g., a base station 105, a UE 115, etc.) may use transmission chain 500 to configure a transmission to a receiving device (e.g., a UE 115, a base station 105, etc.) according to the index modulation procedure.

Transmission chain 500 may implement similar aspects of transmission chain 400 as described with reference to FIG. 4. For example, transmission chain 500 may also include similar input and adjusted bits at 505, 515, 525, 530, 540, and 550 that correspond to 405, 415, 425, 430, 440, and 450 of FIG. 4, respectively. Additionally, transmission chain 400 may also include a channel coding module 510, a rate matching module 520, an index modulation mapper 535, an RE mapper 545, and an OFDM signal generation component 555 that correspond to similarly named modules, mappers, and components as described with reference to FIG. 4.

Alternative to transmission chain 400 and FIG. 4, transmission chain 500 may include RE mapper 545 mapping one or more REs 560 to an RE block that spans multiple TTIs in the time domain. Depicted is a set of REs 560 where frequency is shown vertically and each RE 560 may correspond to a same (or different) subcarrier within a different TTI (e.g., an OFDM symbol period, a slot, etc.) that is shown horizontally. For example, when the number of REs 560 is configured to be two (2) per RE block (e.g., $N_{RE}=2$), a first RE block may consist of an RE 560-$a$ and an RE 560-$b$. Accordingly, one of the REs 560 may include a signal transmission (e.g., bits) that has been power boosted (e.g., by a factor of $\sqrt{2}$ based on $N_{RE}=2$), and the other RE 560 in the RE block may be an empty RE. RE mapper 545 may then map $s_i$ boosted bits according to $b_i$.

For example, one option of a first index modulation configuration (e.g., $b_0=0$) may include RE 560-$a$ carrying the bits ($s_{00}$) multiplied by a boosting factor of $\sqrt{2}$ (e.g., based on $N_{RE}=2$, such that the boosting factor is determined by $\sqrt{N_{RE}}=\sqrt{2}$) and RE 560-$b$ being an empty RE (e.g., containing a '0'). Additionally or alternatively, another option of the first index modulation configuration (e.g., $b_0=1$) may include RE 560-$b$ carrying the bits ($s_{00}$) multiplied by the boosting factor of $\sqrt{2}$ and RE 560-$a$ being an empty RE (e.g., containing a '0'). Subsequent RE blocks may carry corresponding bits until $s_{N_{SC}/N_{RE}}$ bits are allocated to corresponding REs 560 in each RE block (e.g., a second RE block may contain RE 560-$c$ and RE 560-$d$ for a $b_1$ to transmit one or more bits, $s_{10}$).

Figure 6:
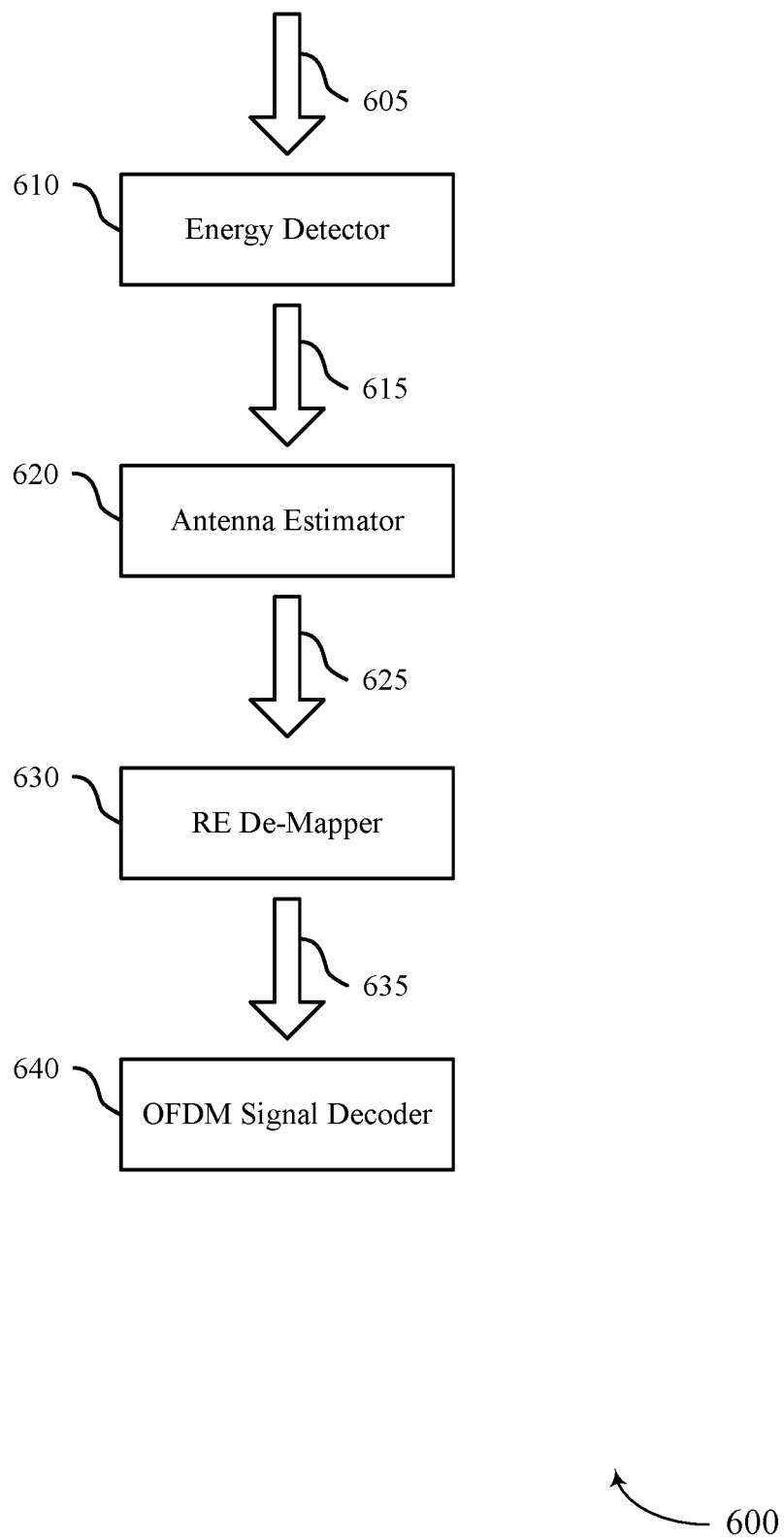
FIG. 6 illustrates an example of a receive chain in accordance with aspects of the present disclosure.

FIG. 6 illustrates an example of a receive chain 600 that supports full-duplex index modulation in accordance with aspects of the present disclosure. In some examples, receive chain 600 may implement aspects or may be implemented by aspects of wireless communications systems 100, wireless communications system 200, or both. A UE 115 may use receive chain 600 to receive and decode a downlink transmission from a base station 105 according to an index modulation procedure as described herein, where the UE 115 is a full-duplex UE 115. Additionally or alternatively, any receiving device (e.g., a UE 115, a base station 105, etc.) may use receive chain 600 to receive a transmission from a transmitting device (e.g., a base station 105, a UE 115, etc.) according to the index modulation procedure.

At 605, the receiving device may receive encoded bits from the transmitting device. These encoded bits may be passed to an energy detector 610. Energy detector 610 may look for and detect index modulation data locations (e.g., active REs carrying an index modulated transmission). For example, energy detector 610 may provide a de-modulator component with symbol locations that have a higher energy (e.g., a maximum energy). In some cases, it may be assumed that an SNR is greater than zero (0) dB due to a boosting used for the index modulation procedure.

Subsequently, at 615, energy detector 610 may pass the identified data locations to an antenna estimator 620. For example, antenna estimator 620 may be an ML detector for estimating a transmitted antenna that the transmitting device uses for transmitting the index modulated transmission (e.g., assuming channel is estimation per transmit antenna). In some cases, antenna estimator 620 may use the identified data locations and a number of REs used for the index modulation procedure (e.g., $N_{RE}$) to estimate and identify the transmit antennas.

At 625, antenna estimator 620 may then pass on the information about the estimated/identified transmit antennas to an RE de-mapper 630. Accordingly, the RE de-mapper 630 may combine QAM data with the index modulated bits obtained from the REs before decoding (e.g., using the information about the estimated/identified transmit antennas). At 635, RE de-mapper 630 may then pass the combined index modulated bits with the QAM data to an OFDM signal decoder 640 that decodes the index modulated transmission to receive information from the transmitting device. Additionally, OFDM signal decoder 640 may pass samples recognized without data signal to an $R_{nn}$ estimator (e.g., in cases of no uplink transmissions).

Figure 7:
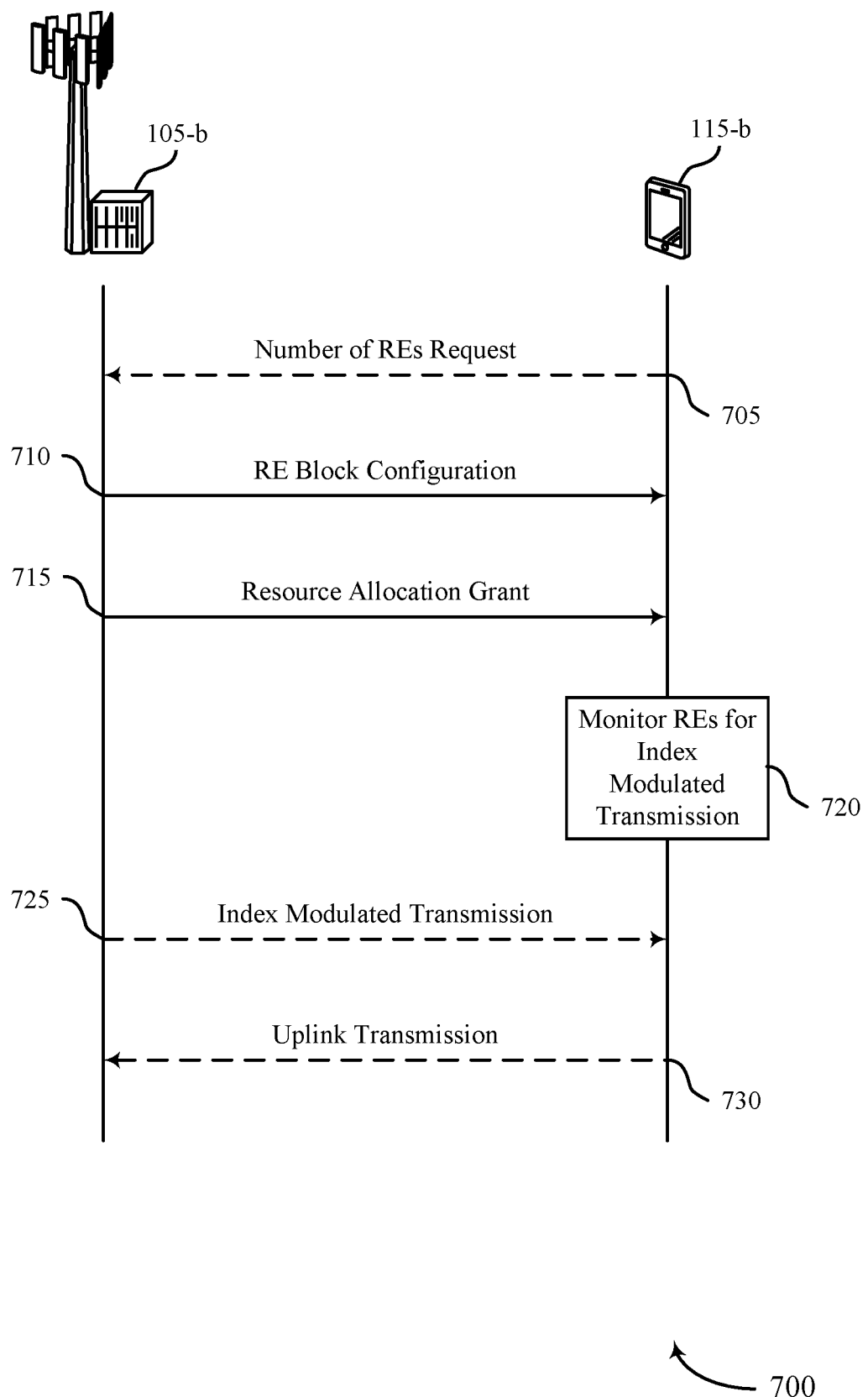
FIG. 7 illustrates an example of a process flow in accordance with aspects of the present disclosure.

FIG. 7 illustrates an example of a process flow 700 that supports full-duplex index modulation in accordance with aspects of the present disclosure. In some examples, process flow 700 may implement aspects or may be implemented by aspects of wireless communications systems 100, wireless communications system 200, or both. Process flow 700 may include a base station 105-$b$ and a UE 115-$b$ which may be examples of corresponding base stations 105 and UEs 115, respectively, as described with reference to FIGS. 1-6. As described herein, UE 115-$b$ may be a full-duplex capable UE 115 as described herein.

In the following description of process flow 700, the operations between UE 115-$b$ and base station 105-$b$ may be transmitted in a different order than the order shown, or the operations performed by base station 105-$b$ and UE 115-$b$ may be performed in different orders or at different times. Certain operations may also be left out of process flow 700, or other operations may be added to process flow 700. It is to be understood that while base station 105-$b$ and UE 115-$b$ are shown performing a number of the operations of process flow 700, any wireless device may perform the operations shown. For example, while base station 105-$b$ is shown in the example of FIG. 7, any transmitting device (e.g., a base station 105, an additional UE 115, etc.) may use the techniques described herein to perform the operations shown.

At 705, UE 115-$b$ may transmit (e.g., to base station 105-$b$) a request that indicates a requested number of REs per RE block. In some cases, UE 115-$b$ may transmit the request that indicates the requested number of REs per RE block based on a requested MCS or a configured MCS, a requested modulation constellation or a configured modulation constellation, a requested frequency allocation or a frequency allocation corresponding to a resource allocation indicated in a grant, a wireless channel condition, a delay spread, a doppler spread, or any combination thereof.

At 710, UE 115-$b$ may receive (e.g., from base station 105-$b$) control signaling indicating an RE block configuration that indicates a number of REs per RE block. In some cases, UE 115-$b$ may receive the control signaling indicating the RE block configuration that indicates the number of REs that is the same as the requested number of REs per RE block. Additionally or alternatively, UE 115-$b$ may receive the control signaling indicating the RE block configuration that indicates the number of REs that is different than the requested number of REs per RE block. In some cases, the control signaling may indicate a predefined index modulation RE block configuration for UE 115-$b$ to use for receiving an index modulated transmission and/or for transmitting an index modulated transmission.

At 715, UE 115-$b$ may receive (e.g., from base station 105-$b$) a grant indicating a resource allocation. In some cases, UE 115-$b$ may receive the grant scheduling the UE to operate in a full-duplex mode and to transmit an uplink transmission within the resource allocation.

At 720, UE 115-$b$ may monitor, based on the RE block configuration, for at least one empty RE (e.g., per RE block, across RE blocks, etc.) within the resource allocation and for an index modulated transmission within a data or control RE (e.g., per RE block, across RE blocks, etc.) within the resource allocation. For example, UE 115-*b* may perform energy detection within the resource allocation to detect a respective location of a data or control RE in each RE block of a set of RE blocks within the resource allocation. Additionally, UE 115-*b* may estimate a number of one or more transmit antennas utilized by a transmitter (e.g., base station 105-*b*) to transmit the index modulated transmission within the set of resource element blocks. Subsequently, UE 115-*b* may identify a number of transmitted bits for the index modulated transmission within the resource allocation based on the estimated number of one or more transmit antennas. Additionally, UE 115-*b* may decode the index modulated transmission from the set of RE blocks based on the identified number of transmitted bits within the resource allocation and the detected respective locations of the data or control REs in each RE block of the set of RE blocks within the resource allocation.

At 725, UE 115-*b* may receive (e.g., from base station 105-*b*) the index modulated transmission that is spread in a frequency domain over a set of subcarriers (e.g., as shown in the example of FIG. 4), where each subcarrier of the plurality of subcarriers corresponds to a respective data location in each RE block of a set of RE blocks within the resource allocation. Additionally or alternatively, UE 115-*b* may receive (e.g., from base station 105-*b*) the index modulated transmission that is spread in a time domain over a set of symbols (e.g., or different length TTI) within the resource allocation (e.g., as shown in the example of FIG. 5).

For example, base station 105-*b* (e.g., or a different transmitting device, such as an additional UE 115) may transmit, based on the RE block configuration, the index modulated transmission within a data or control RE (e.g., per RE block, across RE blocks, etc.) within the resource allocation and may skip transmitting within at least one empty RE (e.g., per RE block, across RE blocks, etc.) within the resource allocation. In some cases, if the index modulated transmission falls on a last RE of a first RE block and on a first RE of a second RE block (e.g., where one of the two REs contains the bits for the index modulated transmission and the other of the two REs is the empty RE), then base station 105-*b* may transmit the index modulated transmission in an RE of one of the RE blocks and may skip transmitting within an RE of the other RE block (e.g., no skipping from the first RE block to the second RE block).

In some cases, base station 105-*b* (e.g., or a different transmitting device) may identify a number of bits to include within the index modulated transmission based on a number of transmit antennas to be utilized for transmitting the index modulated transmission, a modulation constellation, a number of subcarriers within each RE block, and the resource allocation. Additionally, base station 105-*b* (e.g., or a different transmitting device) may index modulate input bits to generate a modulated transmission based on the identified number of bits and the modulation constellation. In some cases, base station 105-*b* (e.g., or a different transmitting device) may also power boost, based on the number of REs per RE block, the modulated transmission at a respective location of a data or control RE in each RE block of a set of RE blocks within the resource allocation to generate the index modulated transmission, where the index modulated transmission is transmitted via at least one transmit antenna that corresponds to the number of transmit antennas.

At 730, UE 115-*b* may transmit (e.g., to base station 105-*b*) the uplink transmission within the resource allocation based on the grant received at 715. In some cases, UE 115-*b* may transmit the uplink transmission concurrently with receiving the index modulated transmission at 725.

Figure 8:
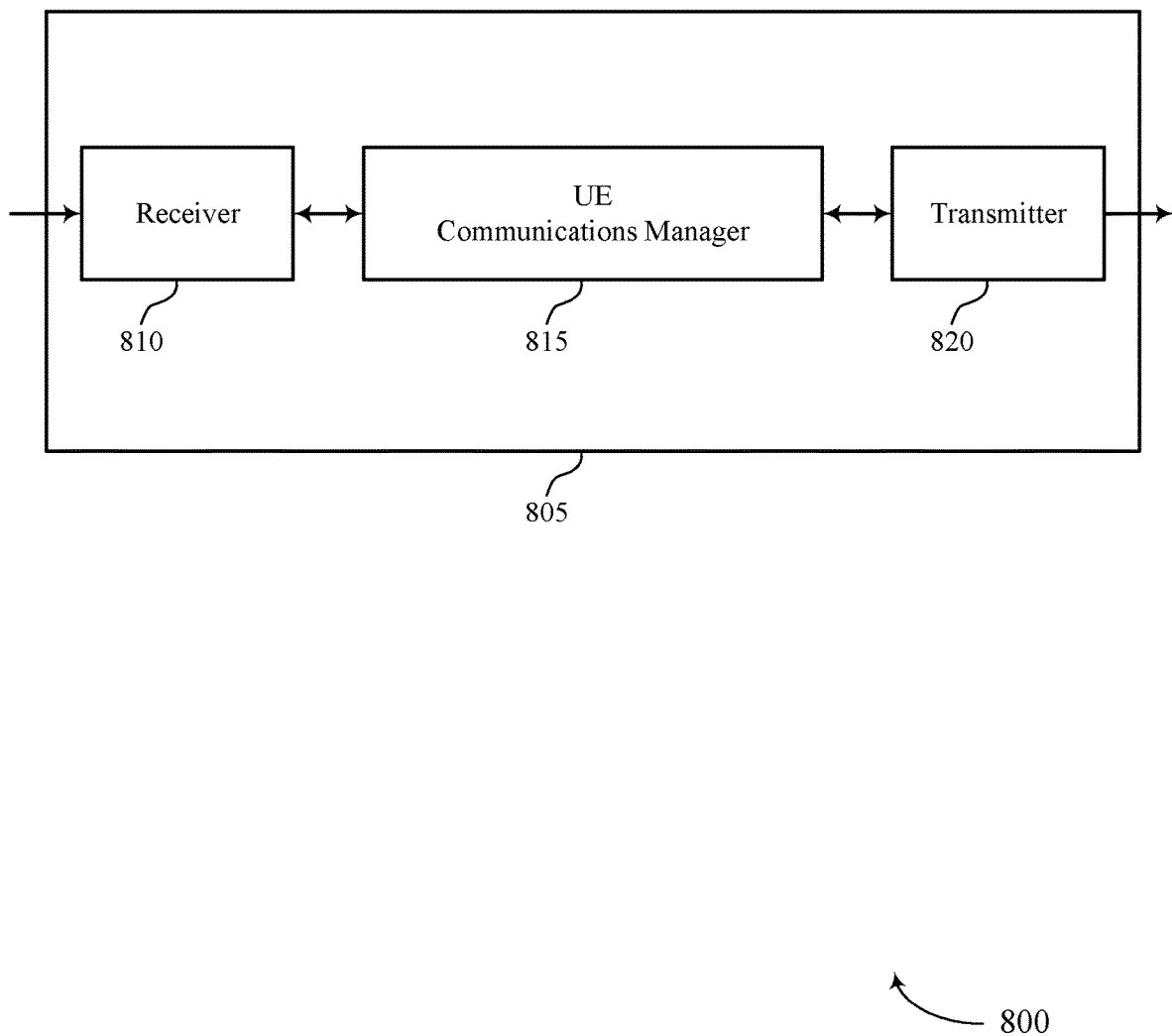
FIGS. 8 and 9 show block diagrams of devices that support full-duplex index modulation in accordance with aspects of the present disclosure.

FIG. 8 shows a block diagram 800 of a device 805 that supports full-duplex index modulation in accordance with aspects of the present disclosure. The device 805 may be an example of aspects of a UE 115 or a receiving device as described herein. The device 805 may include a receiver 810, a UE communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to full-duplex index modulation, etc.). Information may be passed on to other components of the device 805. The receiver 810 may be an example of aspects of the transceiver 1120 described with reference to FIG. 11. The receiver 810 may utilize a single antenna or a set of antennas.

The UE communications manager 815 may receive control signaling indicating an RE block configuration that indicates a number of REs per RE block. Additionally, the UE communications manager 815 may receive a grant indicating a resource allocation. In some cases, the UE communications manager 815 may monitor, based on the RE block configuration, for at least one empty RE (e.g., per RE block, across RE blocks, etc.) within the resource allocation and an index modulated transmission within a data or control RE (e.g., per RE block, across RE blocks, etc.) within the resource allocation. The UE communications manager 815 may be an example of aspects of the UE communications manager 1110 described herein.

In some examples, the UE communications manager 715 as described herein may be implemented to realize one or more potential advantages for a UE 115. For example, based on receiving the indication of the number of REs per RE block and monitoring for an index modulated transmission based on this indication, the UE communications manager 715 may enable the UE 115 to operate in a full-duplex mode without causing a self-interference. Accordingly, the UE communications manager 715 may reduce latency for the UE 115 that arises from having to wait for TTIs configured for uplink communications to transmit an uplink message and, instead, may transmit the uplink message without waiting.

The UE communications manager 815, or its sub-components, may be implemented in hardware, code (e.g., software or firmware) executed by a processor, or any combination thereof. If implemented in code executed by a processor, the functions of the UE communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 815, or its sub-components, may be physically located at various positions, including being distributed such that portions of functions are implemented at different physical locations by one or more physical components. In some examples, the UE communications manager 815, or its sub-components, may be a separate and distinct component in accordance with various aspects of the present disclosure. In some examples, the UE communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
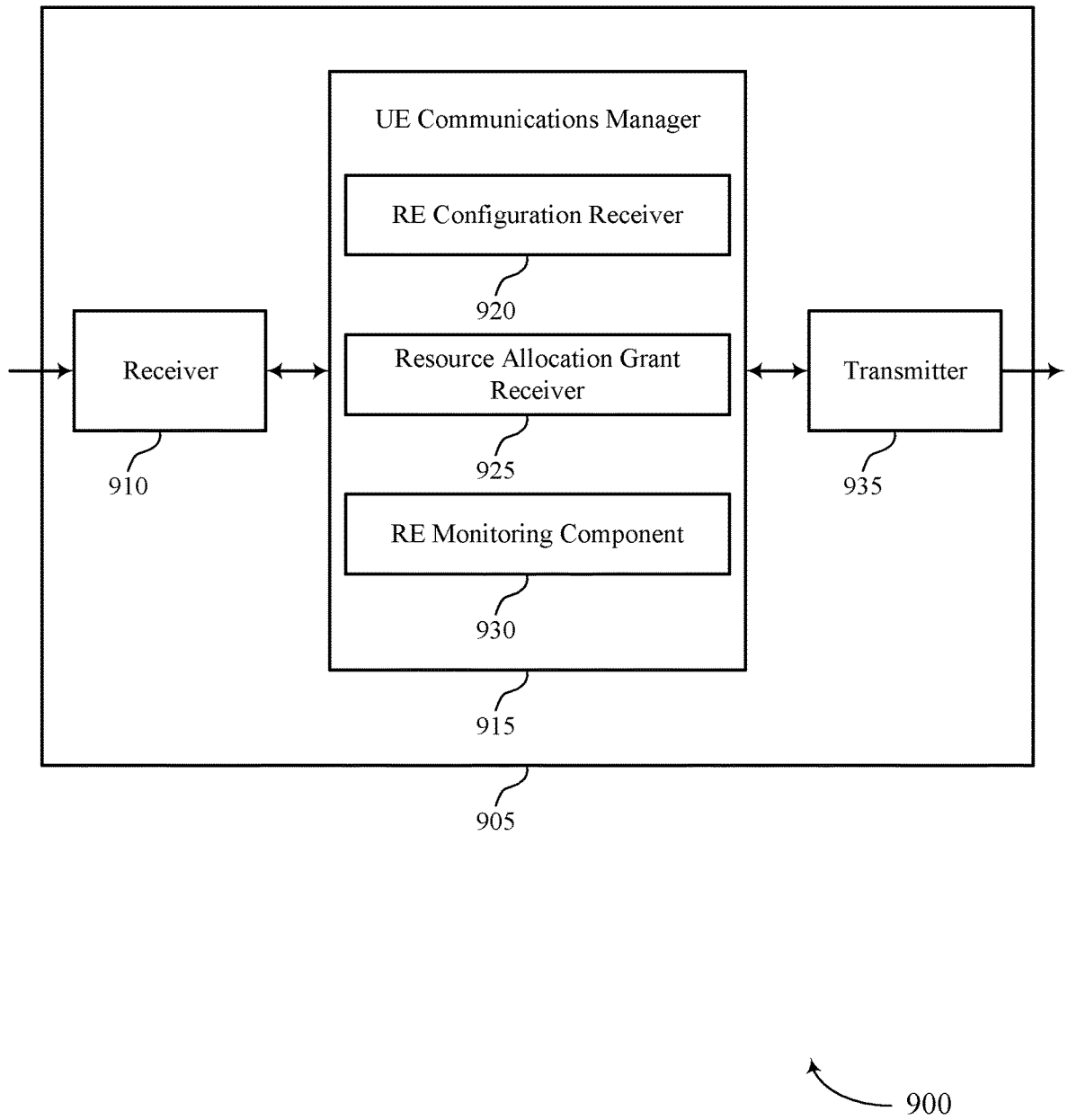

FIG. 9 shows a block diagram 900 of a device 905 that supports full-duplex index modulation in accordance with aspects of the present disclosure. The device 905 may be an example of aspects of a device 805, a UE 115, or a receiving device as described herein. The device 905 may include a receiver 910, a UE communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to full-duplex index modulation, etc.). Information may be passed on to other components of the device 905. The receiver 910 may be an example of aspects of the transceiver 1120 described with reference to FIG. 11. The receiver 910 may utilize a single antenna or a set of antennas.

The UE communications manager 915 may be an example of aspects of the UE communications manager 815 as described herein. The UE communications manager 915 may include an RE configuration receiver 920, a resource allocation grant receiver 925, and an RE monitoring component 930. The UE communications manager 915 may be an example of aspects of the UE communications manager 1110 described herein.

The RE configuration receiver 920 may receive control signaling indicating an RE block configuration that indicates a number of REs per RE block.

The resource allocation grant receiver 925 may receive a grant indicating a resource allocation.

The RE monitoring component 930 may monitor, based on the RE block configuration, for at least one empty RE (e.g., per RE block, across RE blocks, etc.) within the resource allocation and an index modulated transmission within a data or control RE (e.g., per RE block, across RE blocks, etc.) within the resource allocation.

Based on techniques for receiving receive control signaling indicating an RE block configuration, a processor of a UE 115 (for example, controlling the receiver 810, the transmitter 835, or a transceiver 1120 as described with reference to FIG. 11) may efficiently determine locations for receiving an index modulated transmission within a data or control RE per RE block. Accordingly, the processor may reduce signaling overhead by increasing chances that an initial transmission is successfully received and refraining from needing retransmissions. Additionally, the processor may decrease power consumption that would arise from processing multiple transmissions/retransmissions of a signal.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
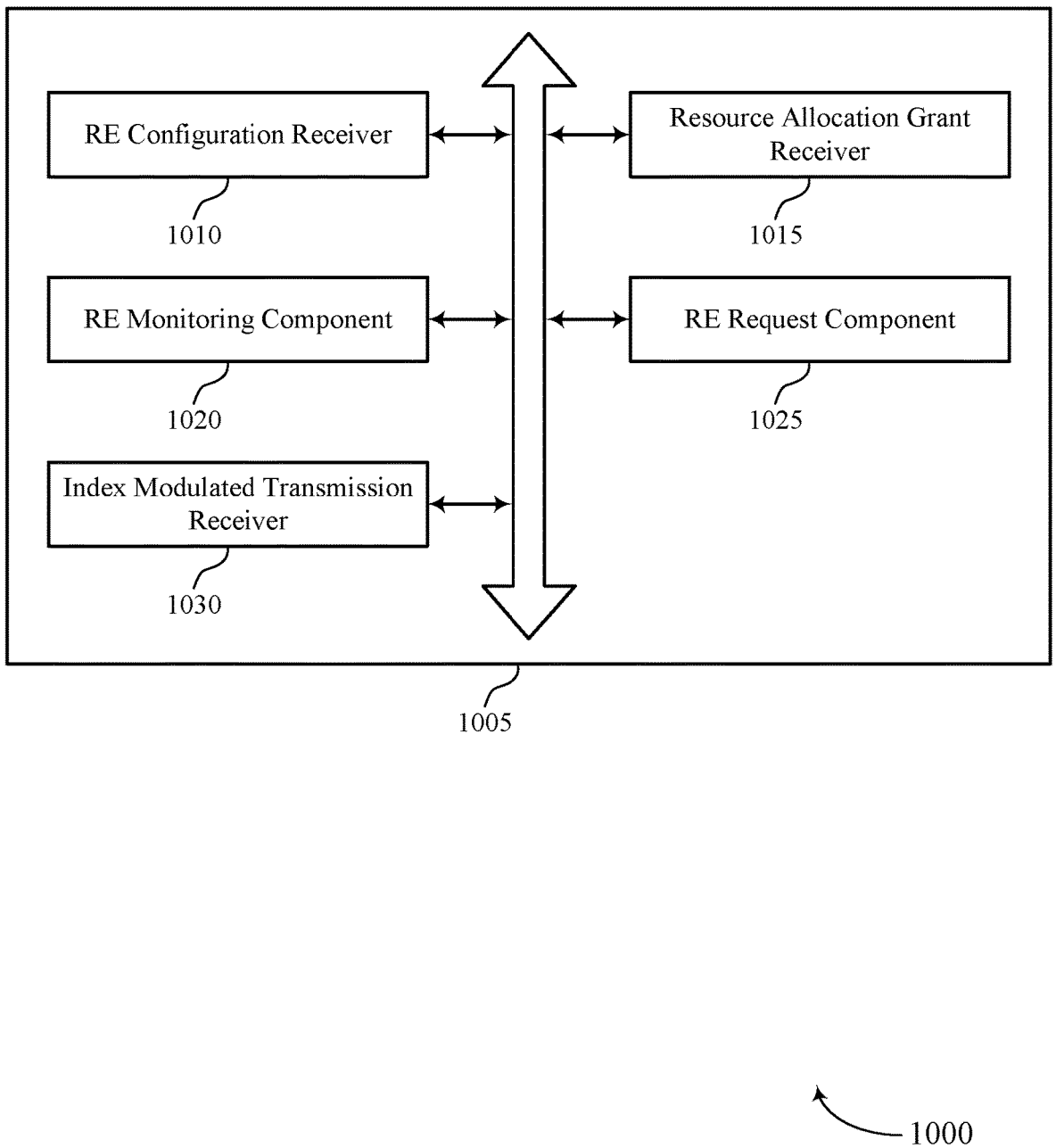
FIG. 10 shows a block diagram of a user equipment (UE) communications manager in accordance with aspects of the present disclosure.

FIG. 10 shows a block diagram 1000 of a UE communications manager 1005 that supports full-duplex index modulation in accordance with aspects of the present disclosure. The UE communications manager 1005 may be an example of aspects of a UE communications manager 815, a UE communications manager 915, or a UE communications manager 1110 described herein. The UE communications manager 1005 may include an RE configuration receiver 1010, a resource allocation grant receiver 1015, an RE monitoring component 1020, an RE request component 1025, and an index modulated transmission receiver 1030. Each of these modules may communicate, directly or indirectly, with one another (e.g., via one or more buses).

The RE configuration receiver 1010 may receive control signaling indicating an RE block configuration that indicates a number of REs per RE block.

The resource allocation grant receiver 1015 may receive a grant indicating a resource allocation. In some examples, the resource allocation grant receiver 1015 may receive the grant scheduling the UE to operate in a full-duplex mode and to transmit an uplink transmission within the resource allocation and may transmit the uplink transmission within the resource allocation.

The RE monitoring component 1020 may monitor, based on the RE block configuration, for at least one empty RE (e.g., per RE block, across RE blocks, etc.) within the resource allocation and an index modulated transmission within a data or control RE (e.g., per RE block, across RE blocks, etc.) within the resource allocation. In some examples, the RE monitoring component 1020 may perform energy detection within the resource allocation to detect a respective location of a data or control RE in each RE block of a set of RE blocks within the resource allocation and may estimate a number of one or more transmit antennas utilized by a transmitter to transmit the index modulated transmission within the set of RE blocks. Additionally, the RE monitoring component 1020 may identify a number of transmitted bits for the index modulated transmission within the resource allocation based on the estimated number of one or more transmit antennas and may decode the index modulated transmission from the set of RE blocks based on the identified number of transmitted bits within the resource allocation and the detected respective locations of the data or control REs in each RE block of the set of RE blocks within the resource allocation.

The RE request component 1025 may transmit a request that indicates a requested number of REs per RE block. In some examples, the RE request component 1025 may receive the control signaling indicating the RE block configuration that indicates the number of REs that is the same as the requested number of REs per RE block. Additionally or alternatively, the RE request component 1025 may receive the control signaling indicating the RE block configuration that indicates the number of REs that is different than the requested number of REs per RE block.

In some examples, the RE request component 1025 may transmit the request that indicates the requested number of REs per RE block based on a requested MCS or a configured MCS, based on a requested modulation constellation or a configured modulation constellation, based on a requested frequency allocation or a frequency allocation corresponding to the resource allocation indicated in the grant, or a combination thereof. Additionally, in some cases, the RE request component 1025 may transmit the request that indicates the requested number of REs per RE block based on a wireless channel condition, a delay spread, a doppler spread, or any combination thereof.

The index modulated transmission receiver 1030 may receive the index modulated transmission that is spread in a frequency domain over a set of subcarriers, each subcarrier of the set of subcarriers corresponding to a respective data location in each RE block of a set of RE blocks within the resource allocation. In some examples, the index modulated transmission receiver 1030 may receive the index modulated transmission that is spread in a time domain over a set of symbols within the resource allocation.

Figure 11:
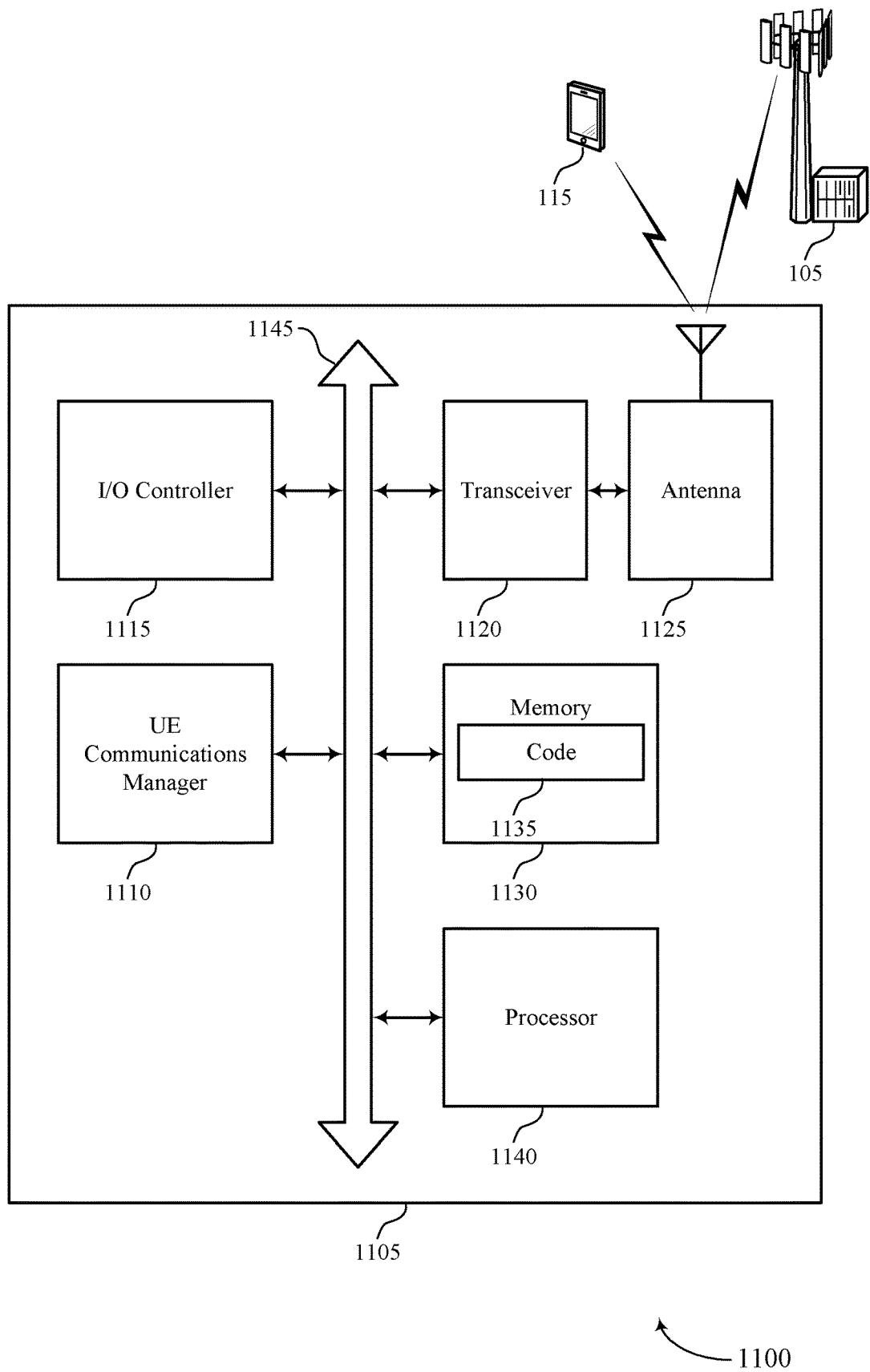
FIG. 11 shows a diagram of a system including a device in accordance with aspects of the present disclosure.

FIG. 11 shows a diagram of a system 1100 including a device 1105 that supports full-duplex index modulation in accordance with aspects of the present disclosure. The device 1105 may be an example of or include the components of device 805, device 905, a UE 115, or a receiving device as described herein. The device 1105 may include components for bi-directional voice and data communications including components for transmitting and receiving communications, including a UE communications manager 1110, an I/O controller 1115, a transceiver 1120, an antenna 1125, memory 1130, and a processor 1140. These components may be in electronic communication via one or more buses (e.g., bus 1145).

The UE communications manager 1110 may receive control signaling indicating an RE block configuration that indicates a number of REs per RE block. Additionally, the UE communications manager 1110 may receive a grant indicating a resource allocation. In some cases, the UE communications manager 1110 may monitor, based on the RE block configuration, for at least one empty RE (e.g., per RE block, across RE blocks, etc.) within the resource allocation and an index modulated transmission within a data or control RE (e.g., per RE block, across RE blocks, etc.) within the resource allocation.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting full-duplex index modulation).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
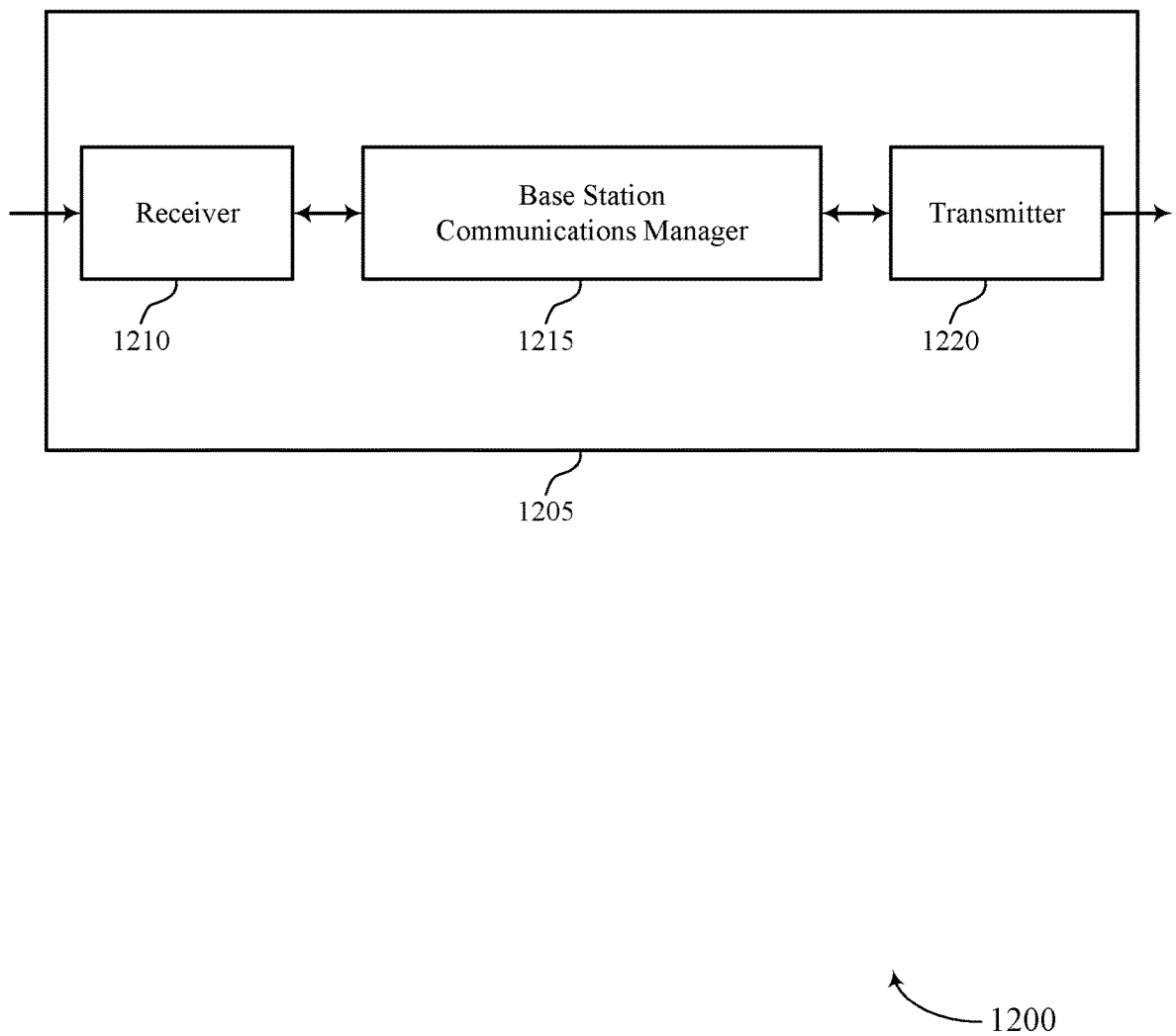
FIGS. 12 and 13 show block diagrams of devices in accordance with aspects of the present disclosure.

FIG. 12 shows a block diagram 1200 of a device 1205 that supports full-duplex index modulation in accordance with aspects of the present disclosure. The device 1205 may be an example of aspects of a base station 105 or a transmitting device as described herein. The device 1205 may include a receiver 1210, a base station communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to full-duplex index modulation, etc.). Information may be passed on to other components of the device 1205. The receiver 1210 may be an example of aspects of the transceiver 1520 described with reference to FIG. 15. The receiver 1210 may utilize a single antenna or a set of antennas.

The base station communications manager 1215 may transmit, to a UE, control signaling indicating an RE block configuration that indicates a number of REs per RE block. Additionally, the base station communications manager 1215 may transmit a grant indicating a resource allocation. In some cases, the base station communications manager 1215 may transmit, based on the RE block configuration, an index modulated transmission within a data or control RE (e.g., per RE block, across RE blocks, etc.) within the resource allocation and may skip transmitting within at least one empty RE (e.g., per RE block, across RE blocks, etc.) within the resource allocation. The base station communications manager 1215 may be an example of aspects of the base station communications manager 1510 described herein.

The base station communications manager 1215, or its sub-components, may be implemented in hardware, code (e.g., software or firmware) executed by a processor, or any combination thereof. If implemented in code executed by a processor, the functions of the base station communications manager 1215, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The base station communications manager 1215, or its sub-components, may be physically located at various positions, including being distributed such that portions of functions are implemented at different physical locations by one or more physical components. In some examples, the base station communications manager 1215, or its sub-components, may be a separate and distinct component in accordance with various aspects of the present disclosure. In some examples, the base station communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
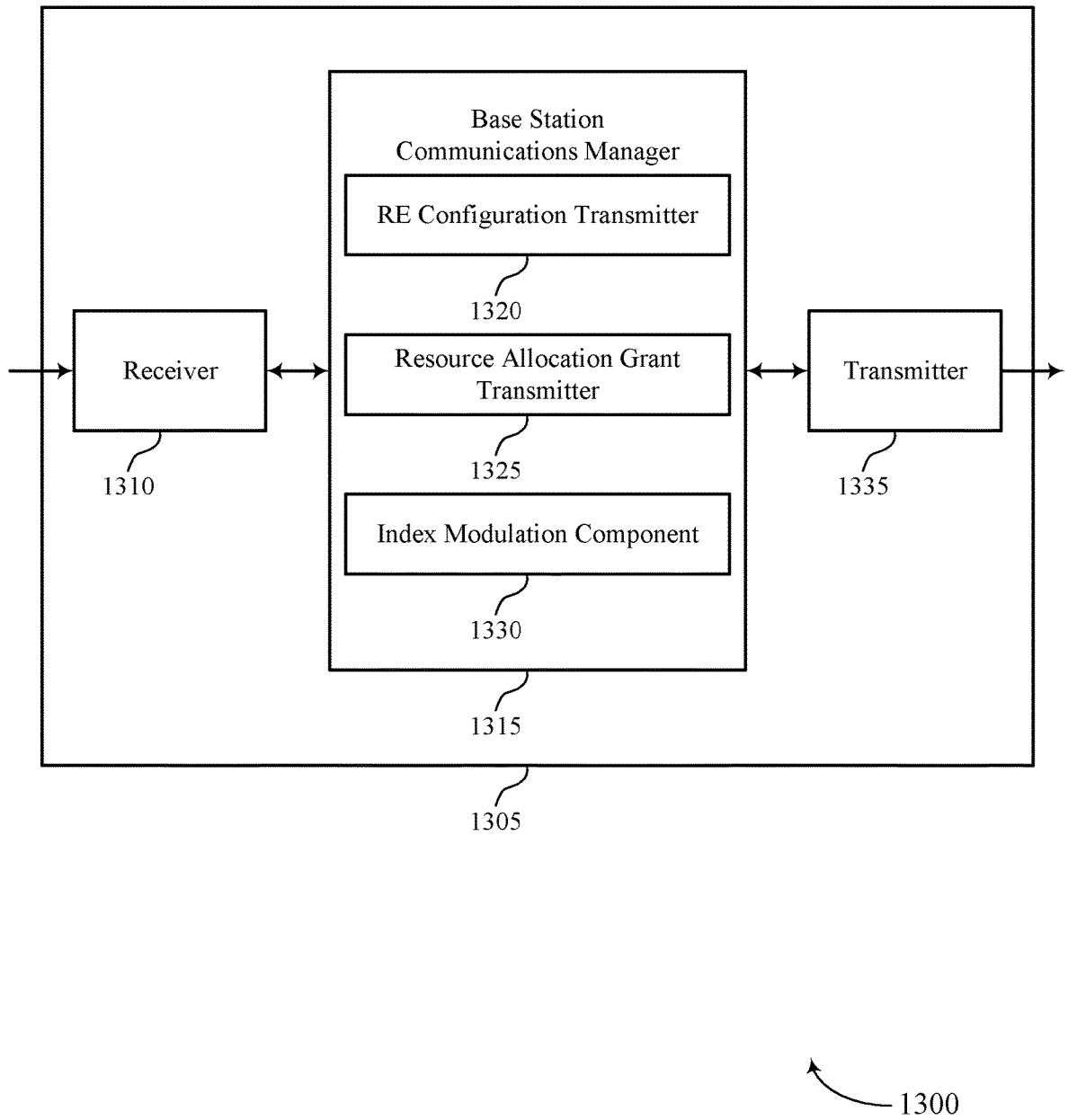

FIG. 13 shows a block diagram 1300 of a device 1305 that supports full-duplex index modulation in accordance with aspects of the present disclosure. The device 1305 may be an example of aspects of a device 1205, a base station 105, or a transmitting device as described herein. The device 1305 may include a receiver 1310, a base station communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to full-duplex index modulation, etc.). Information may be passed on to other components of the device 1305. The receiver 1310 may be an example of aspects of the transceiver 1520 described with reference to FIG. 15. The receiver 1310 may utilize a single antenna or a set of antennas.

The base station communications manager 1315 may be an example of aspects of the base station communications manager 1215 as described herein. The base station communications manager 1315 may include an RE configuration transmitter 1320, a resource allocation grant transmitter 1325, and an index modulation component 1330. The base station communications manager 1315 may be an example of aspects of the base station communications manager 1510 described herein.

The RE configuration transmitter 1320 may transmit, to a UE, control signaling indicating an RE block configuration that indicates a number of REs per RE block.

The resource allocation grant transmitter 1325 may transmit a grant indicating a resource allocation.

The index modulation component 1330 may transmit, based on the RE block configuration, an index modulated transmission within a data or control RE (e.g., per RE block, across RE blocks, etc.) within the resource allocation and may skip transmitting within at least one empty RE (e.g., per RE block, across RE blocks, etc.) within the resource allocation.

The transmitter 1335 may transmit signals generated by other components of the device 1305. In some examples, the transmitter 1335 may be collocated with a receiver 1310 in a transceiver module. For example, the transmitter 1335 may be an example of aspects of the transceiver 1520 described with reference to FIG. 15. The transmitter 1335 may utilize a single antenna or a set of antennas.

Figure 14:
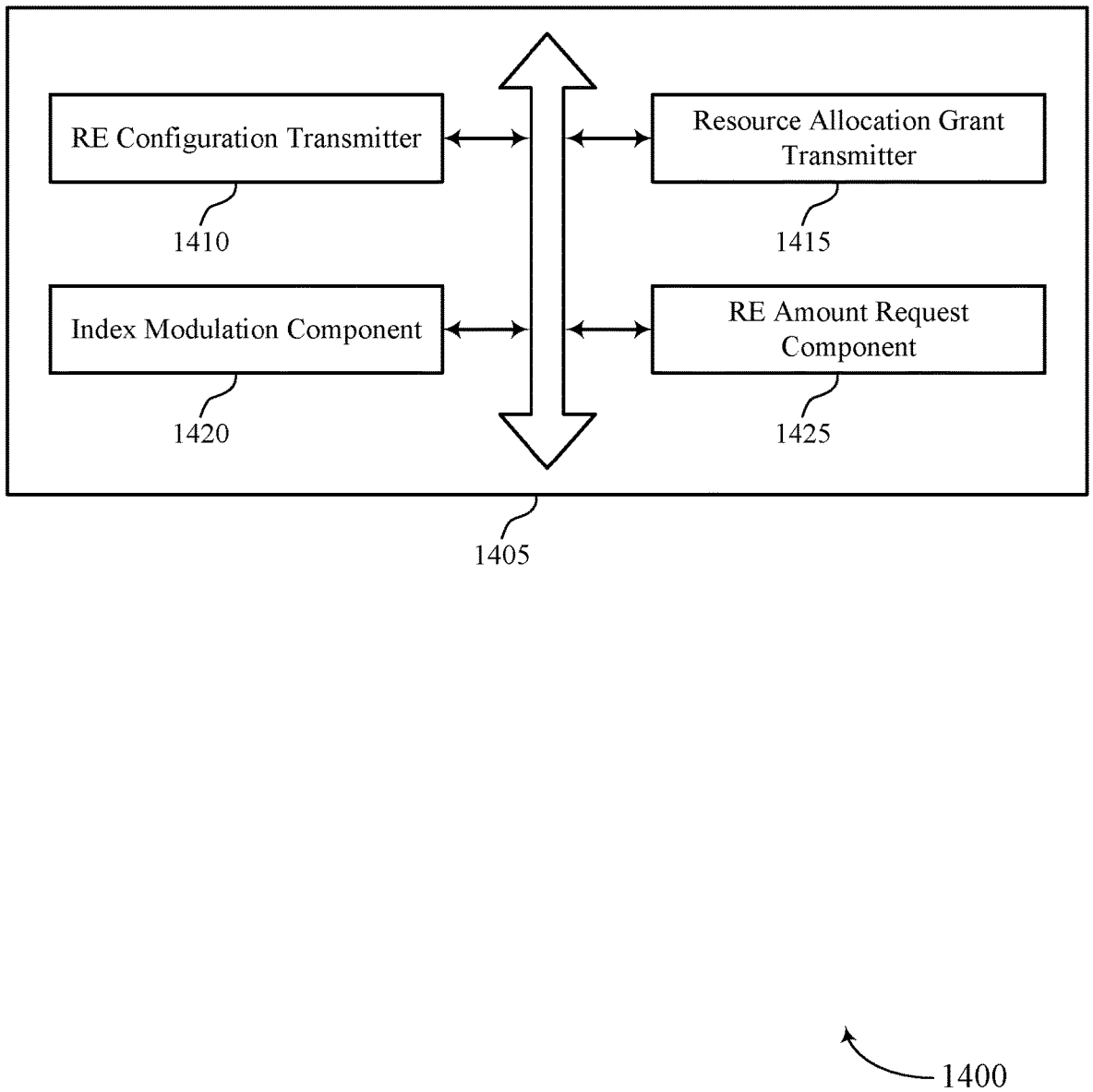
FIG. 14 shows a block diagram of a base station communications manager in accordance with aspects of the present disclosure.

FIG. 14 shows a block diagram 1400 of a base station communications manager 1405 that supports full-duplex index modulation in accordance with aspects of the present disclosure. The base station communications manager 1405 may be an example of aspects of a base station communications manager 1215, a base station communications manager 1315, or a base station communications manager 1510 described herein. The base station communications manager 1405 may include an RE configuration transmitter 1410, a resource allocation grant transmitter 1415, an index modulation component 1420, and an RE amount request component 1425. Each of these modules may communicate, directly or indirectly, with one another (e.g., via one or more buses).

The RE configuration transmitter 1410 may transmit, to a UE, control signaling indicating an RE block configuration that indicates a number of REs per RE block.

The resource allocation grant transmitter 1415 may transmit a grant indicating a resource allocation. In some examples, the resource allocation grant transmitter 1415 may transmit the grant scheduling the UE to operate in a full-duplex mode and to transmit an uplink transmission within the resource allocation and may receive the uplink transmission within the resource allocation.

The index modulation component 1420 may transmit, based on the RE block configuration, an index modulated transmission within a data or control RE (e.g., per RE block, across RE blocks, etc.) within the resource allocation and may skip transmitting within at least one empty RE (e.g., per RE block, across RE blocks, etc.) within the resource allocation. In some examples, the index modulation component 1420 may transmit the index modulated transmission that is spread in a frequency domain over a set of subcarriers, each subcarrier of the set of subcarriers corresponding to a respective data location in each RE block of a set of RE blocks within the resource allocation. Additionally or alternatively, the index modulation component 1420 may transmit the index modulated transmission that is spread in a time domain over a set of symbols within the resource allocation.

In some examples, the index modulation component 1420 may identify a number of bits to include within the index modulated transmission based on a number of transmit antennas to be utilized for transmitting the index modulated transmission, a modulation constellation, a number of subcarriers within each RE block, and the resource allocation. Subsequently, the index modulation component 1420 may index modulate input bits to generate a modulated transmission based on the identified number of bits and the modulation constellation and may power boost, based on the number of REs per RE block, the modulated transmission at a respective location of a data or control RE in each RE block of a set of RE blocks within the resource allocation to generate the index modulated transmission, where the index modulated transmission is transmitted via at least one transmit antenna that corresponds to the number of transmit antennas.

The RE amount request component 1425 may receive a request that indicates a requested number of REs per RE block. In some examples, the RE amount request component 1425 may transmit the control signaling indicating the RE block configuration that indicates the number of REs that is the same as the requested number of REs per RE block. Additionally or alternatively, the RE amount request component 1425 may transmit the control signaling indicating the RE block configuration that indicates the number of REs that is different than the requested number of REs per RE block.

In some examples, the RE amount request component 1425 may receive the request that indicates the requested number of REs per RE block based on a requested MCS or a configured MCS, based on a requested modulation constellation or a configured modulation constellation, based on a requested frequency allocation or a frequency allocation corresponding to the resource allocation indicated in the grant, or a combination thereof. Additionally, in some cases, the RE amount request component 1425 may receive the request that indicates the requested number of REs per RE block based on a wireless channel condition, a delay spread, a doppler spread, or any combination thereof.

Figure 15:
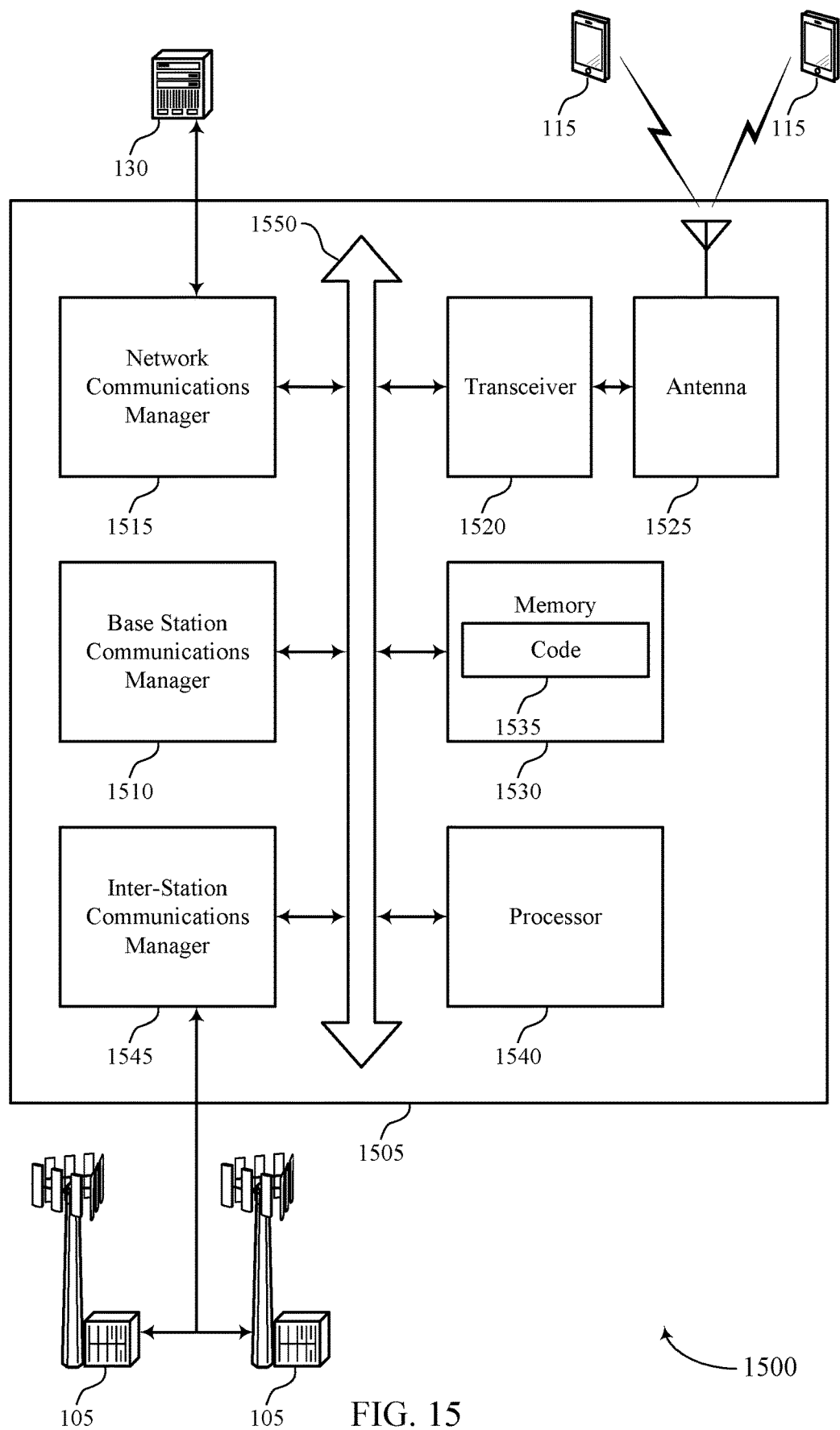
FIG. 15 shows a diagram of a system including a device in accordance with aspects of the present disclosure.

FIG. 15 shows a diagram of a system 1500 including a device 1505 that supports full-duplex index modulation in accordance with aspects of the present disclosure. The device 1505 may be an example of or include the components of device 1205, device 1305, a base station 105, or a transmitting device as described herein. The device 1505 may include components for bi-directional voice and data communications including components for transmitting and receiving communications, including a base station communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The base station communications manager 1510 may transmit, to a UE, control signaling indicating an RE block configuration that indicates a number of REs per RE block. Additionally, the base station communications manager 1510 may transmit a grant indicating a resource allocation. In some cases, the base station communications manager 1510 may transmit, based on the RE block configuration, an index modulated transmission within a data or control RE (e.g., per RE block, across RE blocks, etc.) within the resource allocation and may skip transmitting within at least one empty RE (e.g., per RE block, across RE blocks, etc.) within the resource allocation.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting full-duplex index modulation).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
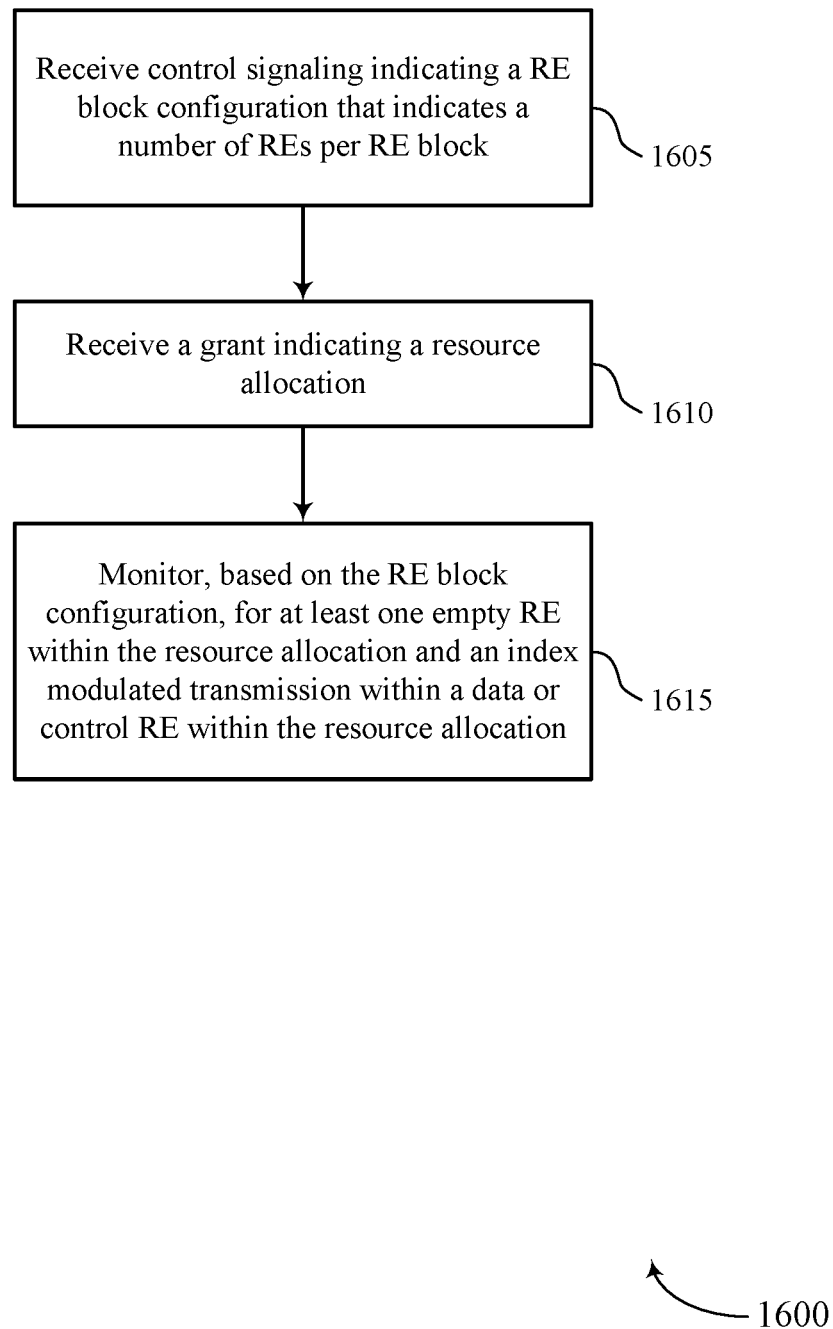
FIGS. 16 through 20 show flowcharts illustrating methods in accordance with aspects of the present disclosure.

FIG. 16 shows a flowchart illustrating a method 1600 that supports full-duplex index modulation in accordance with aspects of the present disclosure. The operations of method 1600 may be implemented by a UE 115 (e.g., a receiving device) or its components as described herein. For example, the operations of method 1600 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive control signaling indicating an RE block configuration that indicates a number of REs per RE block. The operations of 1605 may be performed according to the methods described herein. In some examples, aspects of the operations of 1605 may be performed by an RE configuration receiver as described with reference to FIGS. 8 through 11.

At 1610, the UE may receive a grant indicating a resource allocation. The operations of 1610 may be performed according to the methods described herein. In some examples, aspects of the operations of 1610 may be performed by a resource allocation grant receiver as described with reference to FIGS. 8 through 11.

At 1615, the UE may monitor, based on the RE block configuration, for at least one empty RE (e.g., per RE block, across RE blocks, etc.) within the resource allocation and an index modulated transmission within a data or control RE (e.g., per RE block, across RE blocks, etc.) within the resource allocation. The operations of 1615 may be performed according to the methods described herein. In some examples, aspects of the operations of 1615 may be performed by an RE monitoring component as described with reference to FIGS. 8 through 11.

Figure 17:
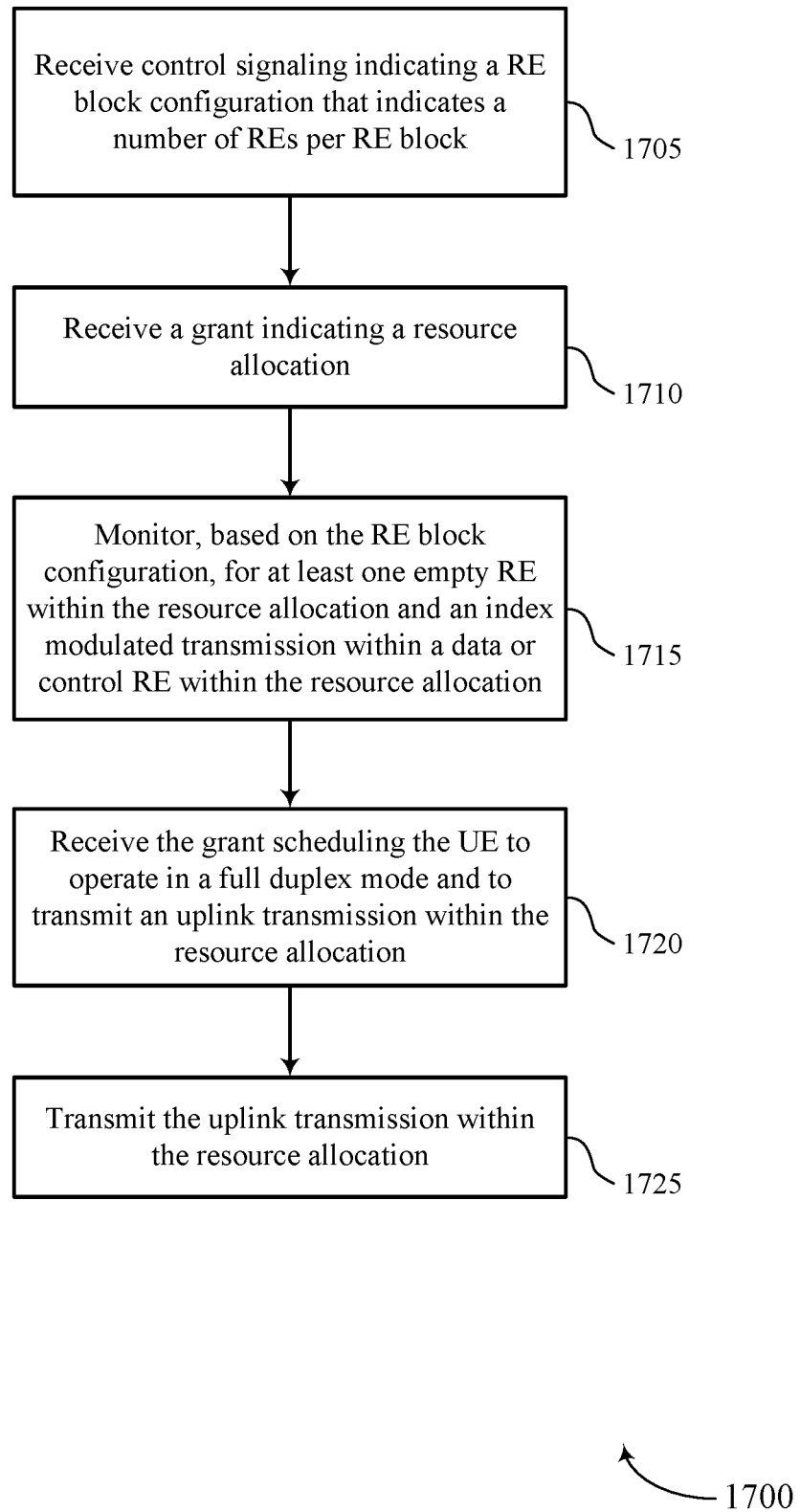

FIG. 17 shows a flowchart illustrating a method 1700 that supports full-duplex index modulation in accordance with aspects of the present disclosure. The operations of method 1700 may be implemented by a UE 115 (e.g., a receiving device) or its components as described herein. For example, the operations of method 1700 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive control signaling indicating an RE block configuration that indicates a number of REs per RE block. The operations of 1705 may be performed according to the methods described herein. In some examples, aspects of the operations of 1705 may be performed by an RE configuration receiver as described with reference to FIGS. 8 through 11.

At 1710, the UE may receive a grant indicating a resource allocation. The operations of 1710 may be performed according to the methods described herein. In some examples, aspects of the operations of 1710 may be performed by a resource allocation grant receiver as described with reference to FIGS. 8 through 11.

At 1715, the UE may monitor, based on the RE block configuration, for at least one empty RE (e.g., per RE block, across RE blocks, etc.) within the resource allocation and an index modulated transmission within a data or control RE (e.g., per RE block, across RE blocks, etc.) within the resource allocation. The operations of 1715 may be performed according to the methods described herein. In some examples, aspects of the operations of 1715 may be performed by an RE monitoring component as described with reference to FIGS. 8 through 11.

At 1720, the UE may receive the grant scheduling the UE to operate in a full-duplex mode and to transmit an uplink transmission within the resource allocation. The operations of 1720 may be performed according to the methods described herein. In some examples, aspects of the operations of 1720 may be performed by a resource allocation grant receiver as described with reference to FIGS. 8 through 11.

At 1725, the UE may transmit the uplink transmission within the resource allocation. The operations of 1725 may be performed according to the methods described herein. In some examples, aspects of the operations of 1725 may be performed by a resource allocation grant receiver as described with reference to FIGS. 8 through 11.

Figure 18:
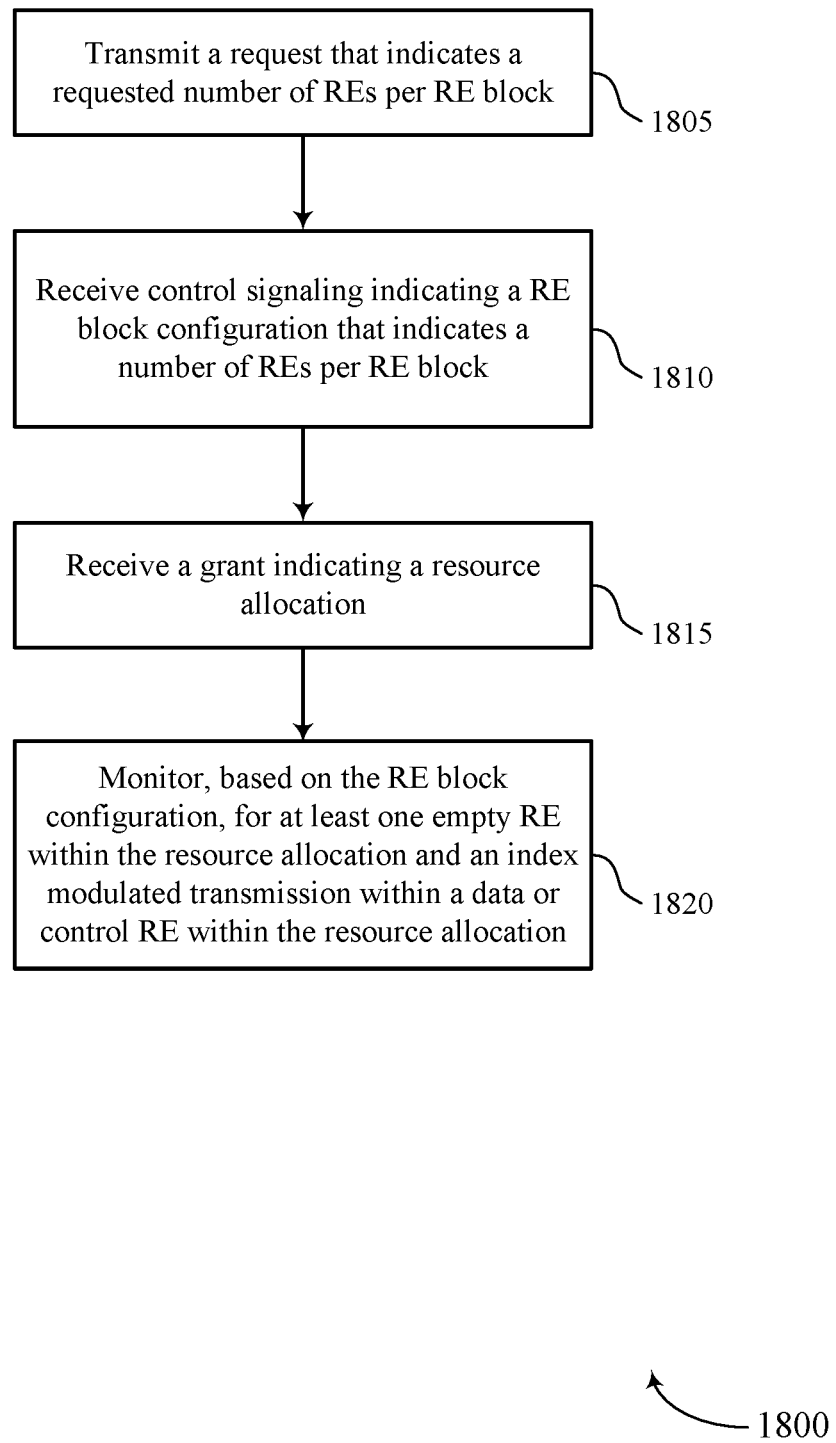

FIG. 18 shows a flowchart illustrating a method 1800 that supports full-duplex index modulation in accordance with aspects of the present disclosure. The operations of method 1800 may be implemented by a UE 115 (e.g., a receiving device) or its components as described herein. For example, the operations of method 1800 may be performed by a UE communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may transmit a request that indicates a requested number of REs per RE block. The operations of 1805 may be performed according to the methods described herein. In some examples, aspects of the operations of 1805 may be performed by an RE request component as described with reference to FIGS. 8 through 11.

At 1810, the UE may receive control signaling indicating an RE block configuration that indicates a number of REs per RE block. The operations of 1810 may be performed according to the methods described herein. In some examples, aspects of the operations of 1810 may be performed by an RE configuration receiver as described with reference to FIGS. 8 through 11.

At 1815, the UE may receive a grant indicating a resource allocation. The operations of 1815 may be performed according to the methods described herein. In some examples, aspects of the operations of 1815 may be performed by a resource allocation grant receiver as described with reference to FIGS. 8 through 11.

At 1820, the UE may monitor, based on the RE block configuration, for at least one empty RE (e.g., per RE block, across RE blocks, etc.) within the resource allocation and an index modulated transmission within a data or control RE (e.g., per RE block, across RE blocks, etc.) within the resource allocation. The operations of 1820 may be performed according to the methods described herein. In some examples, aspects of the operations of 1820 may be performed by an RE monitoring component as described with reference to FIGS. 8 through 11.

Figure 19:
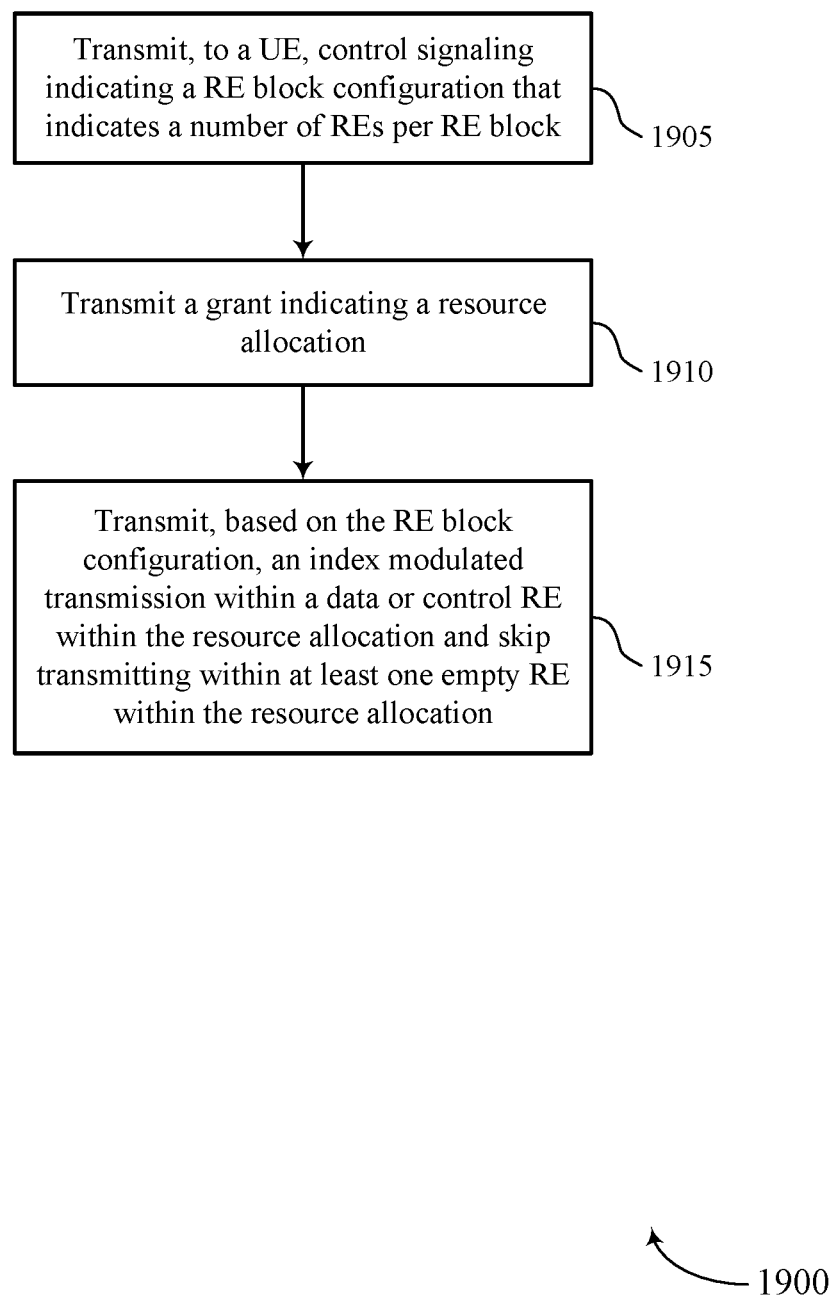

FIG. 19 shows a flowchart illustrating a method 1900 that supports full-duplex index modulation in accordance with aspects of the present disclosure. The operations of method 1900 may be implemented by a base station 105 (e.g., a transmitting device) or its components as described herein. For example, the operations of method 1900 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, control signaling indicating an RE block configuration that indicates a number of REs per RE block. The operations of 1905 may be performed according to the methods described herein. In some examples, aspects of the operations of 1905 may be performed by an RE configuration transmitter as described with reference to FIGS. 12 through 15.

At 1910, the base station may transmit a grant indicating a resource allocation. The operations of 1910 may be performed according to the methods described herein. In some examples, aspects of the operations of 1910 may be performed by a resource allocation grant transmitter as described with reference to FIGS. 12 through 15.

At 1915, the base station may transmit, based on the RE block configuration, an index modulated transmission within a data or control RE (e.g., per RE block, across RE blocks, etc.) within the resource allocation and may skip transmitting within at least one empty RE (e.g., per RE block, across RE blocks, etc.) within the resource allocation. The operations of 1915 may be performed according to the methods described herein. In some examples, aspects of the operations of 1915 may be performed by an index modulation component as described with reference to FIGS. 12 through 15.

Figure 20:
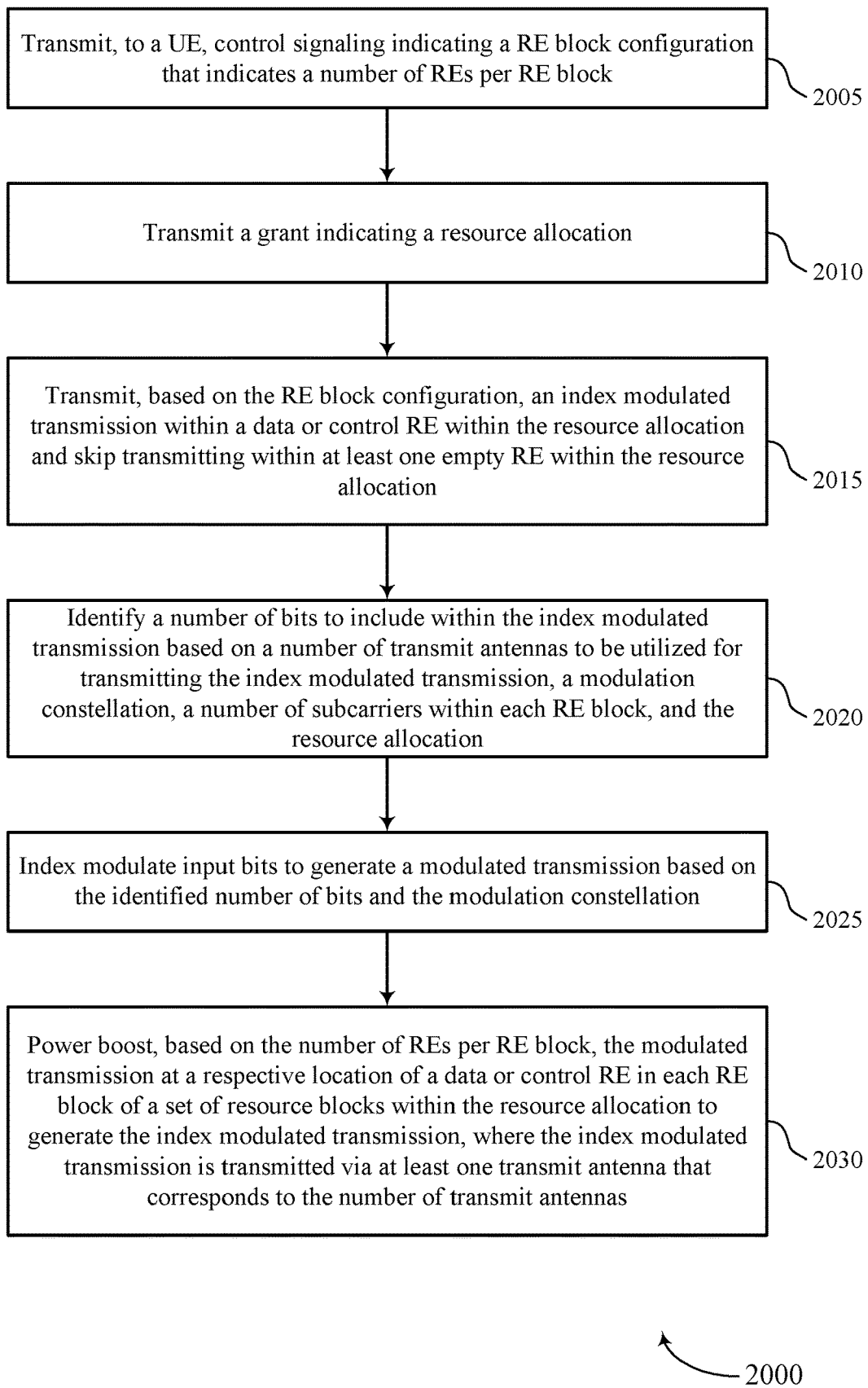

FIG. 20 shows a flowchart illustrating a method 2000 that supports full-duplex index modulation in accordance with aspects of the present disclosure. The operations of method 2000 may be implemented by a base station 105 (e.g., a transmitting device) or its components as described herein. For example, the operations of method 2000 may be performed by a base station communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, control signaling indicating an RE block configuration that indicates a number of REs per RE block. The operations of 2005 may be performed according to the methods described herein. In some examples, aspects of the operations of 2005 may be performed by an RE configuration transmitter as described with reference to FIGS. 12 through 15.

At 2010, the base station may transmit a grant indicating a resource allocation. The operations of 2010 may be performed according to the methods described herein. In some examples, aspects of the operations of 2010 may be performed by a resource allocation grant transmitter as described with reference to FIGS. 12 through 15.

At 2015, the base station may transmit, based on the RE block configuration, an index modulated transmission within a data or control RE (e.g., per RE block, across RE blocks, etc.) within the resource allocation and may skip transmitting within at least one empty RE (e.g., per RE block, across RE blocks, etc.) within the resource allocation. The operations of 2015 may be performed according to the methods described herein. In some examples, aspects of the operations of 2015 may be performed by an index modulation component as described with reference to FIGS. 12 through 15.

At 2020, the base station may identify a number of bits to include within the index modulated transmission based on a number of transmit antennas to be utilized for transmitting the index modulated transmission, a modulation constellation, a number of subcarriers within each RE block, and the resource allocation. The operations of 2020 may be performed according to the methods described herein. In some examples, aspects of the operations of 2020 may be performed by an index modulation component as described with reference to FIGS. 12 through 15.

At 2025, the base station may index modulating input bits to generate a modulated transmission based on the identified number of bits and the modulation constellation. The operations of 2025 may be performed according to the methods described herein. In some examples, aspects of the operations of 2025 may be performed by an index modulation component as described with reference to FIGS. 12 through 15.

At 2030, the base station may power boosting, based on the number of REs per RE block, the modulated transmission at a respective location of a data or control RE in each RE block of a set of RE blocks within the resource allocation to generate the index modulated transmission, where the index modulated transmission is transmitted via at least one transmit antenna that corresponds to the number of transmit antennas. The operations of 2030 may be performed according to the methods described herein. In some examples, aspects of the operations of 2030 may be performed by an index modulation component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications by a UE, comprising: receiving control signaling indicating a resource element block configuration that indicates a number of resource elements per resource element block; receiving a grant indicating a resource allocation; and monitoring, based at least in part on the resource element block configuration, for at least one empty resource element within the resource allocation and an index modulated transmission within a data or control resource element within the resource allocation.

Aspect 2: The method of aspect 1, wherein receiving the grant further comprises: receiving the grant scheduling the UE to operate in a full-duplex mode and to transmit an uplink transmission within the resource allocation; and transmitting the uplink transmission within the resource allocation.

Aspect 3: The method of any of aspects 1 through 2, further comprising: transmitting a request that indicates a requested number of resource elements per resource element block.

Aspect 4: The method of aspect 3, wherein receiving the control signaling indicating the resource element block configuration comprises: receiving the control signaling indicating the resource element block configuration that indicates the number of resource elements that is the same as the requested number of resource elements per resource element block.

Aspect 5: The method of aspect 3, wherein receiving the control signaling indicating the resource element block configuration comprises: receiving the control signaling indicating the resource element block configuration that indicates the number of resource elements that is different than the requested number of resource elements per resource element block.

Aspect 6: The method of any of aspects 3 through 5, wherein transmitting the request comprises: transmitting the request that indicates the requested number of resource elements per resource element block based at least in part on a requested modulation and coding scheme or a configured modulation and coding scheme.

Aspect 7: The method of any of aspects 3 through 5, wherein transmitting the request comprises: transmitting the request that indicates the requested number of resource elements per resource element block based at least in part on a requested modulation constellation or a configured modulation constellation.

Aspect 8: The method of any of aspects 3 through 5, wherein transmitting the request comprises: transmitting the request that indicates the requested number of resource elements per resource element block based at least in part on a requested frequency allocation or a frequency allocation corresponding to the resource allocation indicated in the grant.

Aspect 9: The method of any of aspects 3 through 5, wherein transmitting the request comprises: transmitting the request that indicates the requested number of resource elements per resource element block based at least in part on a wireless channel condition, a delay spread, a doppler spread, or any combination thereof.

Aspect 10: The method of any of aspects 1 through 9, further comprising: receiving the index modulated transmission that is spread in a frequency domain over a plurality of subcarriers, each subcarrier of the plurality of subcarriers corresponding to a respective data location in each resource element block of a plurality of resource element blocks within the resource allocation.

Aspect 11: The method of any of aspects 1 through 10, further comprising: receiving the index modulated transmission that is spread in a time domain over a plurality of symbols within the resource allocation.

Aspect 12: The method of any of aspects 1 through 11, wherein the monitoring further comprises: performing energy detection within the resource allocation to detect a respective location of a data or control resource element in each resource element block of a plurality of resource element blocks within the resource allocation; estimating a number of one or more transmit antennas utilized by a transmitter to transmit the index modulated transmission within the plurality of resource element blocks; identifying a number of transmitted bits for the index modulated transmission within the resource allocation based at least in part on the estimated number of one or more transmit antennas; and decoding the index modulated transmission from the plurality of resource element blocks based at least in part on the identified number of transmitted bits within the resource allocation and the detected respective locations of the data or control resource elements in each resource element block of the plurality of resource element blocks within the resource allocation.

Aspect 13: A method for wireless communications by a base station, comprising: transmitting, to a UE, control signaling indicating a resource element block configuration that indicates a number of resource elements per resource element block; transmitting a grant indicating a resource allocation; and transmitting, based at least in part on the resource element block configuration, an index modulated transmission within a data or control resource element within the resource allocation and skipping transmitting within at least one empty resource element within the resource allocation.

Aspect 14: The method of aspect 13, wherein transmitting the grant further comprises: transmitting the grant scheduling the UE to operate in a full-duplex mode and to transmit an uplink transmission within the resource allocation; and receiving the uplink transmission within the resource allocation.

Aspect 15: The method of any of aspects 13 through 14, further comprising: receiving a request that indicates a requested number of resource elements per resource element block.

Aspect 16: The method of aspect 15, wherein transmitting the control signaling indicating the resource element block configuration comprises: transmitting the control signaling indicating the resource element block configuration that indicates the number of resource elements that is the same as the requested number of resource elements per resource element block.

Aspect 17: The method of aspect 15, wherein transmitting the control signaling indicating the resource element block configuration comprises: transmitting the control signaling indicating the resource element block configuration that indicates the number of resource elements that is different than the requested number of resource elements per resource element block.

Aspect 18: The method of any of aspects 15 through 17, wherein receiving the request comprises: receiving the request that indicates the requested number of resource elements per resource element block based at least in part on a requested modulation and coding scheme or a configured modulation and coding scheme.

Aspect 19: The method of any of aspects 15 through 17, wherein receiving the request comprises: receiving the request that indicates the requested number of resource elements per resource element block based at least in part on a requested modulation constellation or a configured modulation constellation.

Aspect 20: The method of any of aspects 15 through 17, wherein receiving the request comprises: receiving the request that indicates the requested number of resource elements per resource element block based at least in part on a requested frequency allocation or a frequency allocation corresponding to the resource allocation indicated in the grant.

Aspect 21: The method of any of aspects 15 through 17, wherein receiving the request comprises: receiving the request that indicates the requested number of resource elements per resource element block based at least in part on a wireless channel condition, a delay spread, a doppler spread, or any combination thereof.

Aspect 22: The method of any of aspects 13 through 21, further comprising: transmitting the index modulated transmission that is spread in a frequency domain over a plurality of subcarriers, each subcarrier of the plurality of subcarriers corresponding to a respective data location in each resource element block of a plurality of resource element blocks within the resource allocation.

Aspect 23: The method of any of aspects 13 through 22, wherein transmitting the index modulated transmission comprises: transmitting the index modulated transmission that is spread in a time domain over a plurality of symbols within the resource allocation.

Aspect 24: The method of any of aspects 13 through 23, wherein transmitting the index modulated transmission comprises: identifying a number of bits to include within the index modulated transmission based at least in part on a number of transmit antennas to be utilized for transmitting the index modulated transmission, a modulation constellation, a number of subcarriers within each resource element block, and the resource allocation; index modulating input bits to generate a modulated transmission based at least in part on the identified number of bits and the modulation constellation; and power boosting, based at least in part on the number of resource elements per resource element block, the modulated transmission at a respective location of a data or control resource element in each resource element block of a plurality of resource element blocks within the resource allocation to generate the index modulated transmission, wherein the index modulated transmission is transmitted via at least one transmit antenna that corresponds to the number of transmit antennas.

Aspect 25: An apparatus for wireless communications by a UE, comprising a processor; memory coupled with the processor; and instructions stored in the memory and executable by the processor to cause the apparatus to perform a method of any of aspects 1 through 12.

Aspect 26: An apparatus for wireless communications by a UE, comprising at least one means for performing a method of any of aspects 1 through 12.

Aspect 27: A non-transitory computer-readable medium storing code for wireless communications by a UE, the code comprising instructions executable by a processor to perform a method of any of aspects 1 through 12.

Aspect 28: An apparatus for wireless communications by a base station, comprising a processor; memory coupled with the processor; and instructions stored in the memory and executable by the processor to cause the apparatus to perform a method of any of aspects 13 through 24.

Aspect 29: An apparatus for wireless communications by a base station, comprising at least one means for performing a method of any of aspects 13 through 24.

Aspect 30: A non-transitory computer-readable medium storing code for wireless communications by a base station, the code comprising instructions executable by a processor to perform a method of any of aspects 13 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications by a user equipment (UE), comprising:
receiving control signaling indicating a resource element block configuration that indicates a number of resource elements per resource element block;
receiving a grant indicating a resource allocation comprising a plurality of resource element blocks;
monitoring, within each of the plurality of resource element blocks of the resource allocation and based at least in part on the resource element block configuration, for at least one empty resource element and an index modulated downlink transmission within a data or control resource element;
receiving, from a transmitter and based at least in part on the monitoring, the index modulated downlink transmission; and
transmitting, to the transmitter, feedback corresponding to the at least one empty resource element.

2. The method of claim 1, wherein receiving the grant further comprises:
receiving the grant scheduling the UE to operate in a full-duplex mode and to transmit an uplink transmission within the resource allocation; and
wherein the method further comprises:
transmitting, based at least in part on the grant, the uplink transmission within the resource allocation.

3. The method of claim 1, further comprising:
transmitting a request that indicates a requested number of resource elements per resource element block.

4. The method of claim 3, wherein receiving the control signaling indicating the resource element block configuration comprises:
receiving the control signaling indicating the resource element block configuration that indicates the number of resource elements that is the same as the requested number of resource elements per resource element block.

5. The method of claim 3, wherein receiving the control signaling indicating the resource element block configuration comprises:
receiving the control signaling indicating the resource element block configuration that indicates the number of resource elements that is different than the requested number of resource elements per resource element block.

6. The method of claim 3, wherein transmitting the request comprises:
transmitting the request that indicates the requested number of resource elements per resource element block based at least in part on a requested modulation and coding scheme or a configured modulation and coding scheme.

7. The method of claim 3, wherein transmitting the request comprises:
transmitting the request that indicates the requested number of resource elements per resource element block based at least in part on a requested modulation constellation or a configured modulation constellation.

8. The method of claim 3, wherein transmitting the request comprises:
transmitting the request that indicates the requested number of resource elements per resource element block based at least in part on a requested frequency allocation or a frequency allocation corresponding to the resource allocation indicated in the grant.

9. The method of claim 3, wherein transmitting the request comprises:
transmitting the request that indicates the requested number of resource elements per resource element block based at least in part on a wireless channel condition, a delay spread, a doppler spread, or any combination thereof.

10. The method of claim 1, wherein the index modulated downlink transmission is spread in a frequency domain over a plurality of subcarriers, each subcarrier of the plurality of subcarriers corresponding to a respective data location in each resource element block of the plurality of resource element blocks within the resource allocation.

11. The method of claim 1, wherein the index modulated downlink transmission is spread in a time domain over a plurality of symbols within the resource allocation.

12. The method of claim 1, wherein the monitoring further comprises:
performing energy detection within the resource allocation to detect a respective location of a data or control resource element in each resource element block of the plurality of resource element blocks within the resource allocation;
estimating a number of one or more transmit antennas utilized by the transmitter to transmit the index modulated downlink transmission within the plurality of resource element blocks;
identifying a number of transmitted bits for the index modulated downlink transmission within the resource allocation based at least in part on the estimated number of one or more transmit antennas; and
decoding the index modulated downlink transmission from the plurality of resource element blocks to receive information from the transmitter, wherein the decoding is based at least in part on the identified number of transmitted bits within the resource allocation and detected respective locations of data or control resource elements in the plurality of resource element blocks within the resource allocation.

13. The method of claim 1, further comprising:
performing, using one or more of the at least one empty resource element, noise estimation.

14. An apparatus for wireless communications by a user equipment (UE), comprising:
one or more processors and one or more memories coupled with the one or more processors, and instructions stored in the one or more memories and executable by the one or more processors to cause the apparatus to:
receive control signaling indicating a resource element block configuration that indicates a number of resource elements per resource element block;
receive a grant indicating a resource allocation comprising a plurality of resource element blocks;
monitor, within each of the plurality of resource element blocks of the resource allocation and based at least in part on the resource element block configuration, for at least one empty resource element and an index modulated downlink transmission within a data or control resource element;

receive, from a transmitter and based at least in part on the monitoring, the index modulated downlink transmission; and transmit, to the transmitter, feedback corresponding to the at least one empty resource element.

15. The apparatus of claim 14, further comprising a transceiver, wherein, the instructions to receive the grant, are further executable by the one or more processors to cause the apparatus to:

receive, via the transceiver, the grant scheduling the UE to operate in a full-duplex mode and to transmit an uplink transmission within the resource allocation; and wherein the instructions are further executable by the one or more processors to cause the apparatus to:

transmit, via the transceiver and based at least in part on the grant, the uplink transmission within the resource allocation.

16. The apparatus of claim 14, wherein the instructions are further executable by the one or more processors to cause the apparatus to: transmit a request that indicates a requested number of resource elements per resource element block.

17. The apparatus of claim 16, wherein the instructions to receive the control signaling indicating the resource element block configuration are further executable by the one or more processors to cause the apparatus to:

receive the control signaling indicating the resource element block configuration that indicates the number of resource elements that is the same as the requested number of resource elements per resource element block.

18. The apparatus of claim 16, wherein the instructions to receive the control signaling indicating the resource element block configuration are further executable by the one or more processors to cause the apparatus to:

receive the control signaling indicating the resource element block configuration that indicates the number of resource elements that is different than the requested number of resource elements per resource element block.

19. The apparatus of claim 16, wherein the instructions to transmit the request are further executable by the one or more processors to cause the apparatus to:

transmit the request that indicates the requested number of resource elements per resource element block based at least in part on a requested modulation and coding scheme or a configured modulation and coding scheme.

20. The apparatus of claim 16, wherein the instructions to transmit the request are further executable by the one or more processors to cause the apparatus to:

transmit the request that indicates the requested number of resource elements per resource element block based at least in part on a requested modulation constellation or a configured modulation constellation.

21. The apparatus of claim 16, wherein the instructions to transmit the request are further executable by the one or more processors to cause the apparatus to:

transmit the request that indicates the requested number of resource elements per resource element block based at least in part on a requested frequency allocation or a frequency allocation corresponding to the resource allocation indicated in the grant.

22. The apparatus of claim 16, wherein the instructions to transmit the request are further executable by the one or more processors to cause the apparatus to:

transmit the request that indicates the requested number of resource elements per resource element block based at least in part on a wireless channel condition, a delay spread, a doppler spread, or any combination thereof.

23. The apparatus of claim 14, wherein the index modulated downlink transmission is spread in a frequency domain over a plurality of subcarriers, each subcarrier of the plurality of subcarriers corresponding to a respective data location in each resource element block of the plurality of resource element blocks within the resource allocation.

24. The apparatus of claim 14, wherein the index modulated downlink transmission is spread in a time domain over a plurality of symbols within the resource allocation.

25. The apparatus of claim 14, wherein the instructions to monitors are further executable by the one or more processors to cause the apparatus to:

perform energy detection within the resource allocation to detect a respective location of a data or control resource element in each resource element block of the plurality of resource element blocks within the resource allocation;

estimate a number of one or more transmit antennas utilized by the transmitter to transmit the index modulated downlink transmission within the plurality of resource element blocks;

identify a number of transmitted bits for the index modulated downlink transmission within the resource allocation based at least in part on the estimated number of one or more transmit antennas; and decode the index modulated downlink transmission from the plurality of resource element blocks to receive information from the transmitter, wherein the decoding is based at least in part on the identified number of transmitted bits within the resource allocation and the detected respective locations of data or control resource elements in the plurality of resource element blocks within the resource allocation.

26. The apparatus of claim 14, wherein the instructions are further executable by the one or more processors to cause the apparatus to:

perform, using one or more of the at least one empty resource element, noise estimation.

27. A non-transitory computer-readable medium storing code for wireless communication by a user equipment (UE), the code comprising instructions executable by one or more processors to:

receive control signaling indicating a resource element block configuration that indicates a number of resource elements per resource element block;

receive a grant indicating a resource allocation comprising a plurality of resource element blocks;

monitor, within each of the plurality of resource element blocks of the resource allocation and based at least in part on the resource element block configuration, for at least one empty resource element and an index modulated downlink transmission within a data or control resource element;

receive, from a transmitter and based at least in part on the monitoring, the index modulated downlink transmission; and transmit, to the transmitter, feedback corresponding to the at least one empty resource element.

28. The non-transitory computer-readable medium of claim 27, wherein the instructions to receive the grant further are further executable by the one or more processors to:

receive the grant scheduling the UE to operate in a full-duplex mode and to transmit an uplink transmission within the resource allocation; and wherein the instructions are further executable by the one or more processors to:

transmit, based at least in part on the grant, the uplink transmission within the resource allocation.

29. The non-transitory computer-readable medium of claim 27, wherein the instructions are further executable by the one or more processors to:

transmit a request that indicates a requested number of resource elements per resource element block, wherein the instructions to receive the control signaling indicating the resource element block configuration are further executable by the one or more processors to:

receive the control signaling indicating the resource element block configuration that indicates the number of resource elements that is the same as the requested number of resource elements per resource element block.

30. The non-transitory computer-readable medium of claim 27, wherein the instructions are further executable by the one or more processors to:

transmit a request that indicates a requested number of resource elements per resource element block, wherein the instructions to receive the control signaling indicating the resource element block configuration are further executable by the one or more processors to:

receive the control signaling indicating the resource element block configuration that indicates the number of resource elements that is different than the requested number of resource elements per resource element block.

31. The non-transitory computer-readable medium of claim 27, wherein the instructions are further executable by the one or more processors to:

transmit a request that indicates a requested number of resource elements per resource element block based at least in part on a requested modulation and coding scheme, a configured modulation and coding scheme, a requested modulation constellation, a configured modulation constellation, a requested frequency allocation, a frequency allocation corresponding to the resource allocation indicated in the grant, a wireless channel condition, a delay spread, a doppler spread, or any combination thereof.

32. The non-transitory computer-readable medium of claim 27, wherein the index modulated downlink transmission is spread in:

a frequency domain over a plurality of subcarriers, each subcarrier of the plurality of subcarriers corresponding to a respective data location in each resource element block of the plurality of resource element blocks within the resource allocation, or a time domain over a plurality of symbols within the resource allocation.

* * * * *